INVENTOR
ISHMAEL CRAWFORD

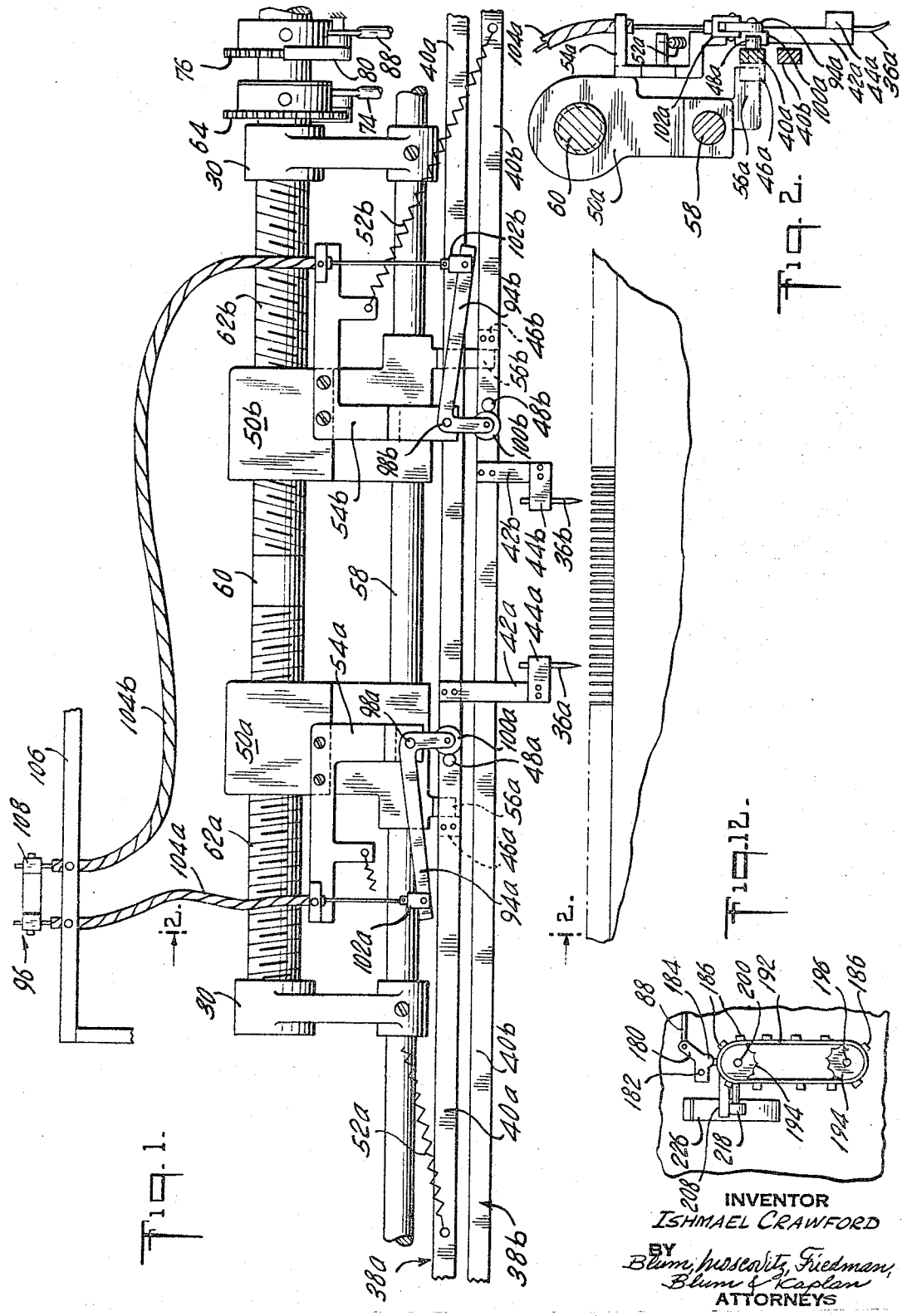

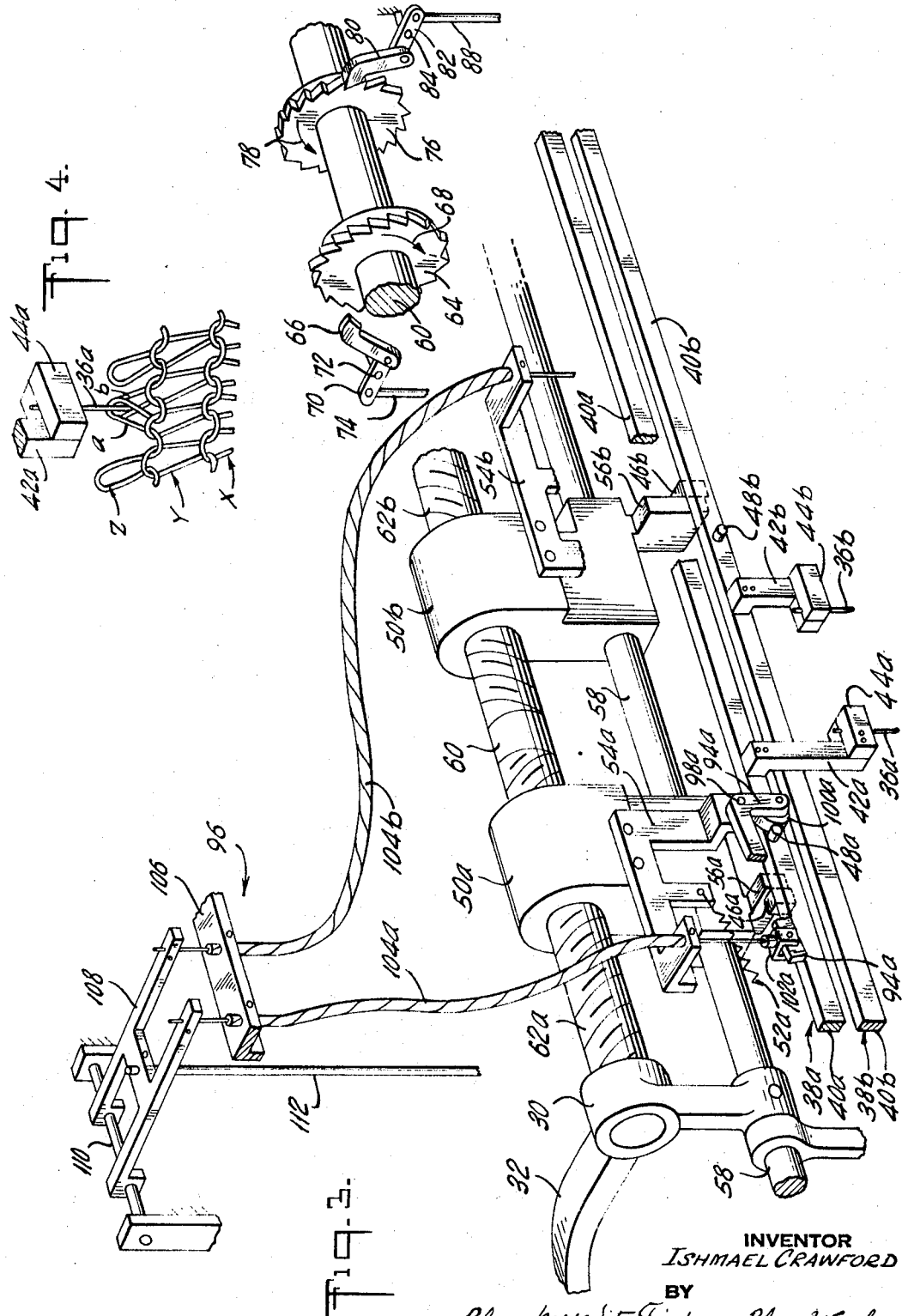

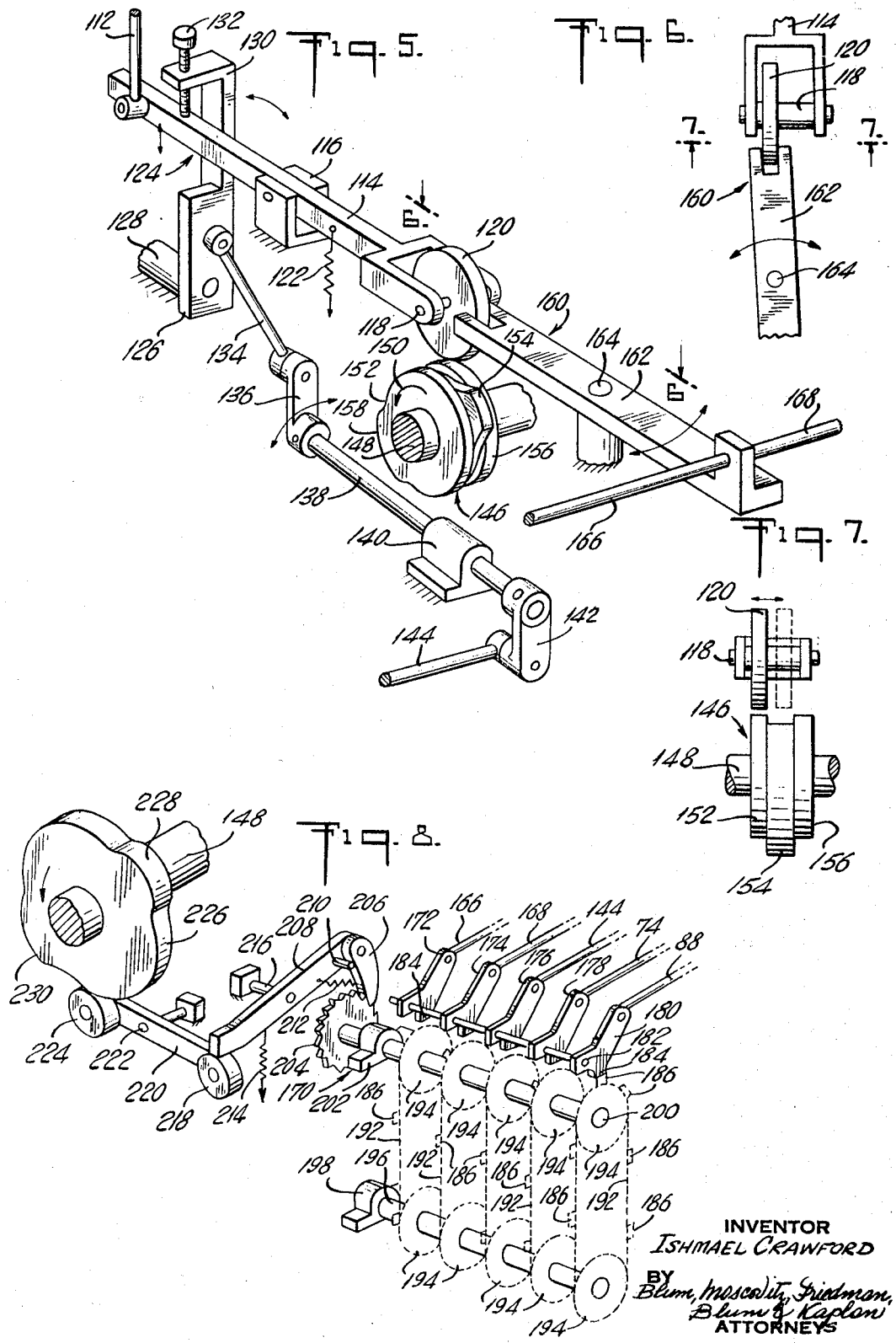

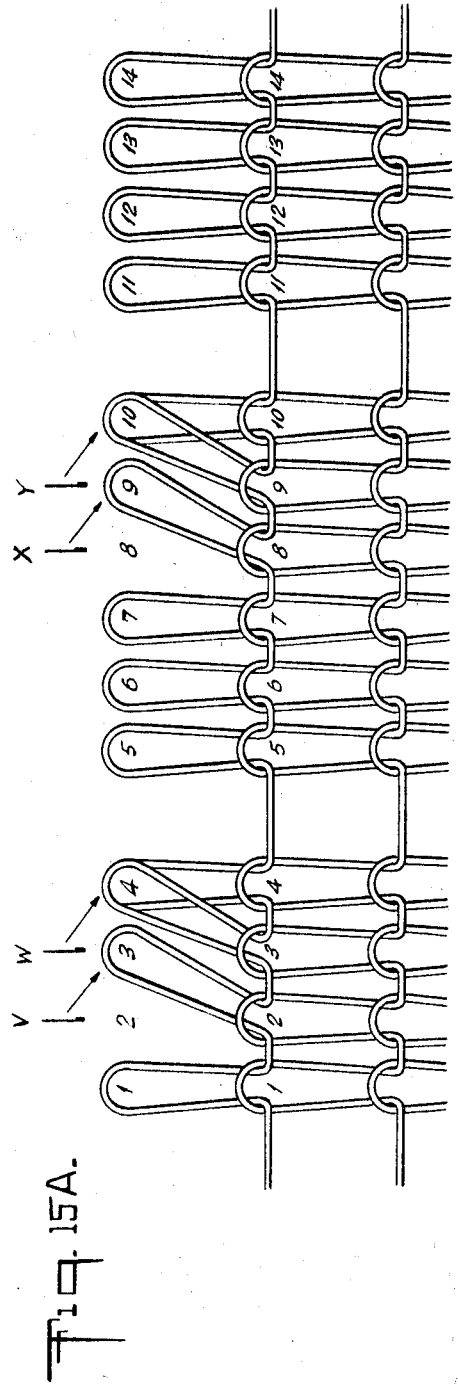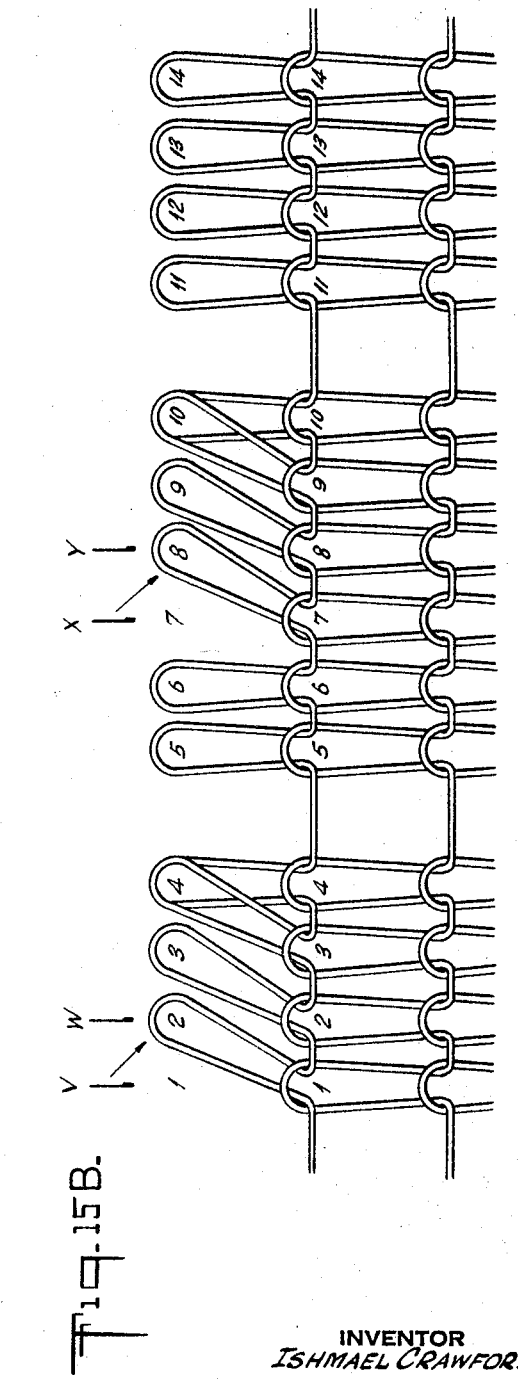

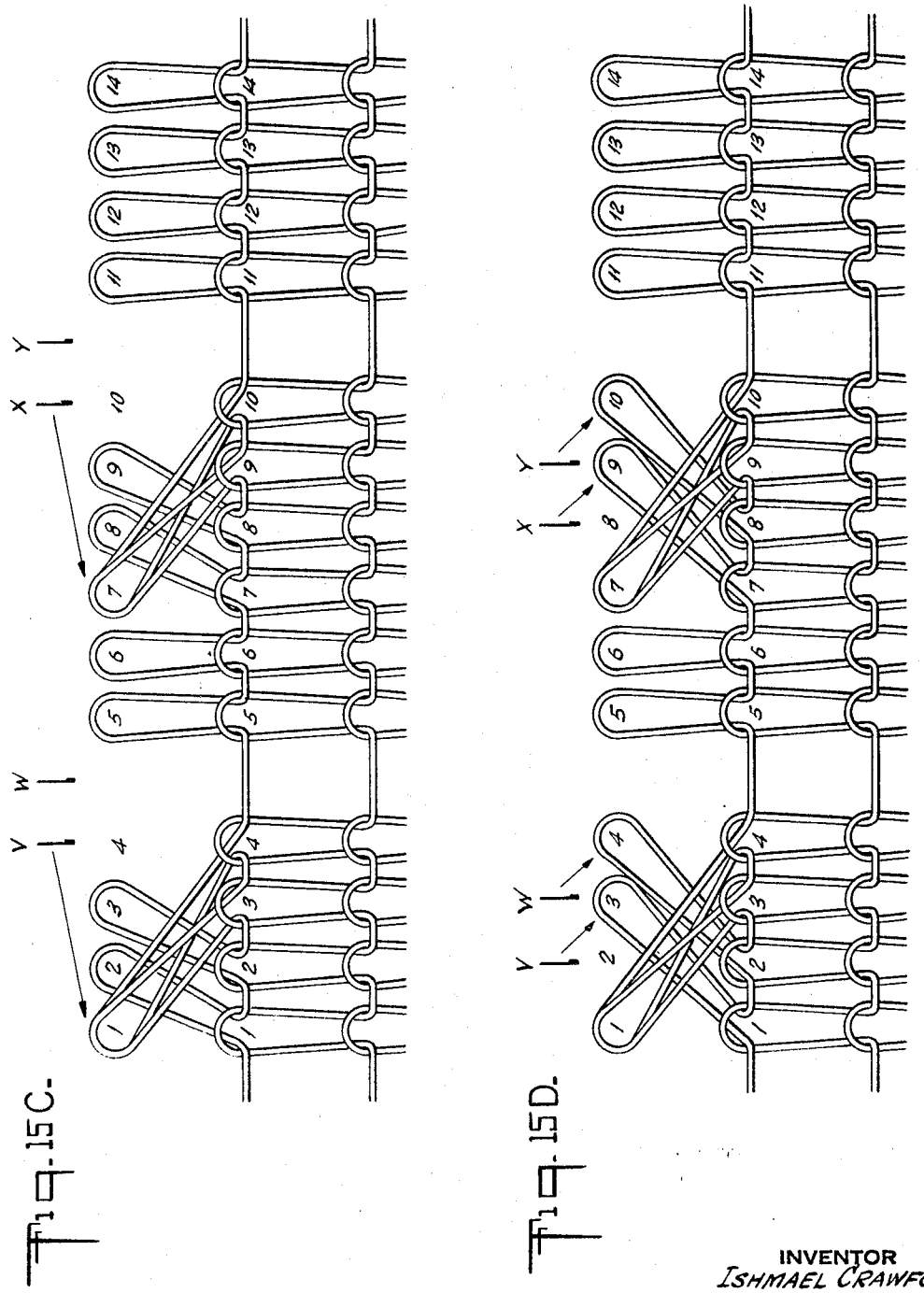

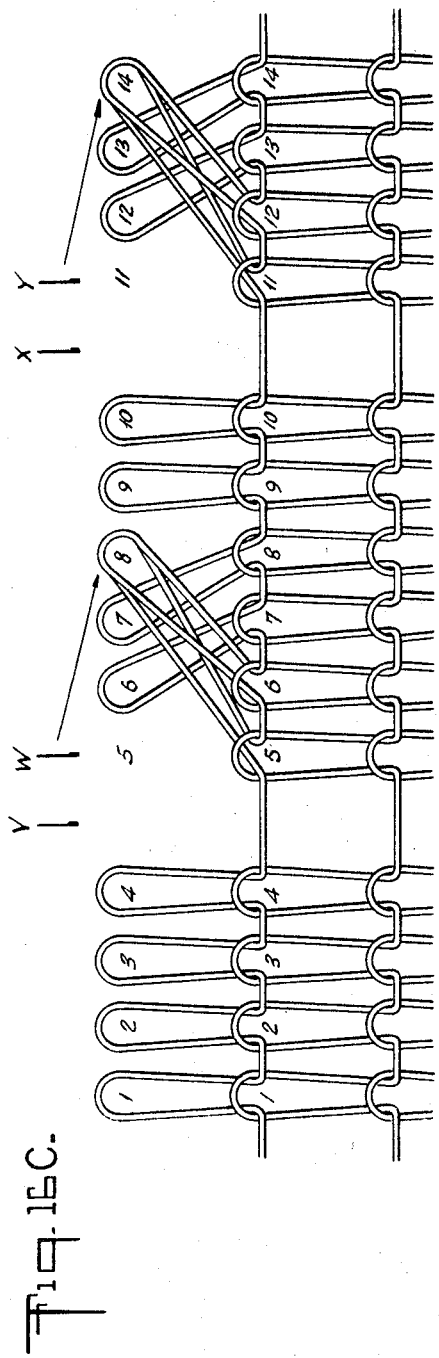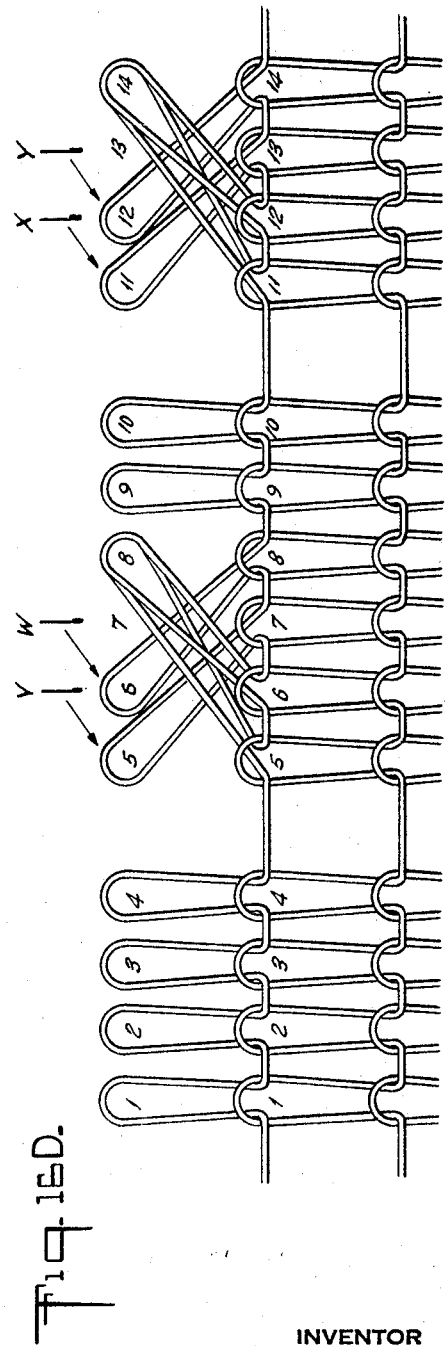

March 11, 1969    I. CRAWFORD    3,431,752
CABLE KNITTING METHOD AND APPARATUS
Filed Aug. 12, 1966

INVENTOR
ISHMAEL CRAWFORD
BY
Blum, Moscovitz, Friedman, Blum & Kaplan
ATTORNEYS

INVENTOR
ISHMAEL CRAWFORD
BY Blum, Moscovitz, Friedman, Blum & Kaplan
ATTORNEYS

INVENTOR
ISHMAEL CRAWFORD

United States Patent Office 3,431,752
Patented Mar. 11, 1969

3,431,752
CABLE KNITTING METHOD AND APPARATUS
Ishmael Crawford, Fort Lauderdale, Fla., assignor to Colebrook Mills, Inc., Hialeah, Fla., a corporation of Delaware
Filed Aug. 12, 1966, Ser. No. 572,144
U.S. Cl. 66—96   17 Claims
Int. Cl. D04b 15/04

ABSTRACT OF THE DISCLOSURE

A cable knitting method and apparatus. A series of loops are transposed from an initial series of at least four wales to other wales while at least two of these loops are displaced across different numbers of wales, respectively, in a manner leaving a non-central wale empty of loops, so that on one side of the empty wale there is at least one more loop-occupied wale than on the opposite side. The cable points are shifted along lateral strokes equal to a distance of one, two, and three wales, and the shifting means for shifting the points includes one mechanism for carrying out strokes of one and two wales, while a second mechanism is provided for carrying out an additional stroke of one wale which when added to the stroke of the two wales provides the stroke of three wales.

---

The present invention relates to knitting.

More particularly, the present invention relates to the knitting of cables in garments such as sweaters and the like.

It is conventional to provide on garments such as sweaters elongated knitted cables which generally extend vertically along the front of the garment at the right and left sides thereof. Such cables may also be provided in garments in addition to sweaters, such as knitted skirts, coats, and the like. Because of the complex operations involved in the knitting of the cables, it has been the practice for many years to provide the cable knitting through manual operations. Such manual operations of course greatly increase the cost of the articles. While it has already been proposed to provide mechanical cable knitting, it is possible at the present time to provide only the most elementary, simple type of mechanically knitted cables in which loops in the wales of a given course are simply interchangeably transposed with other loops in a symmetrical manner. Moreover, special reconstruction of a knitting machine is required. Up to the present time it has not been possible to provide mechanically any more elaborate types of knitted cables. The cable points on a conventional machine can be shifted only in the same way as narrowing points through strokes equal to a distance of one or two wales, and the best that can be done with conventional machines is to provide multiple-pronged cable points capable of shifting two or three loops in one direction to be interchanged with two or three loops which are shifted in the opposite direction, so as to provide a simple symmetrical transposition of the loops. If cables more elaborate than rudimentary symmetrical transposition of loops are desired, it is still necessary to resort to manual operations.

It is a primary object of the present invention to provide a knitting method and apparatus which will enable relatively complex cable to be knitted in a fully automatic manner.

In addition it is an object of the invention to provide for a cable knitting apparatus a programming structure capable of programming any desired sequence of operations to operate the cable knitting structure to provide any desired type of cable in a fully automatic manner.

In addition, it is an important object of the invention to provide a cable knitting structure in the form of a simple attachment which can be added to any conventional knitting machine to enable the conventional knitting machine to knit cables automatically.

Furthermore, it is an object of the invention to provide a simple structure which can selectively increase the stroke through which the cable points are shifted beyond the one or two wale-strokes which can be achieved with conventional knitting structures so that, for example, with the structure of the invention it is possible to shift the cable points through a distance of three wales.

Moreover, it is an object of the invention to provide a non-symmetrical cable and a cable knitting method and apparatus according to which non-symmetrical cables can be knitted in a fully automatic manner.

It is also an object of the invention to provide a structure which will guarantee that the loops remain securely engaged by the cable points during shifting of the loops with the cable points.

Furthermore, it is an object of the invention to provide a structure which not only is highly flexible with respect to its capability of providing widely different types of knitted cables but which in addition is quite simple and rugged so as to be highly reliable in operation.

Furthermore, the objects of the invention include the provision of a structure of the above type which is capable of operation at high speed and with high accuracy.

With the method and apparatus of the present invention at least one cable point is capable of being shifted transversely of the wales of a knitted fabric by a shifting means which can carry out strokes of one, two or three wales, and a programming means actuates the shifting means so as to cause it to carry out these strokes in a predetermined sequence which will provide a preselected knitted cable structure. With the method of the invention instead of simple symmetrical transposition of the loops it is possible, for example, to situate two adjoining loops at the same wale and to shift different loops transversely by distances equal to different numbers of wales, respectively.

The invention is illustrated by way of example in the accompanying drawings which form part of this application and in which:

FIG. 1 is a front elevation of one possible cable-point supporting and shifting structure according to the invention;

FIG. 2 is a transverse section of the structure of FIG. 1 taken along line 2—2 of FIG. 1 in the direction of the arrows;

FIG. 3 is a fragmentary perspective illustration of the structure of FIG. 1 showing, in addition to the structure of FIG. 1, part of the structure for actuating the structure of FIG. 1;

FIG. 4 is a fragmentary perspective illustration of the operation of a cable point;

FIG. 5 is a fragmentary perspective illustration of structure connected with the structure of FIG. 3 for actuating the part of the structure shown in FIG. 3;

FIG. 6 is a fragmentary plan view taken along line 6—6 of FIG. 5 in the direction of the arrows and showing structure for selectively placing a motion transmission of the invention in a selected position;

FIG. 7 is a fragmentary elevation taken along line 7—7 of FIG. 6 in the direction of the arrows for further illustrating the position-selecting structure for the transmission shown in FIG. 5;

FIG. 8 is a schematic illustration of the programming means together with the structure for actuating the programming means;

FIG. 12 is a schematic side elevation of the programming structure of FIG. 8;

Figure 9:
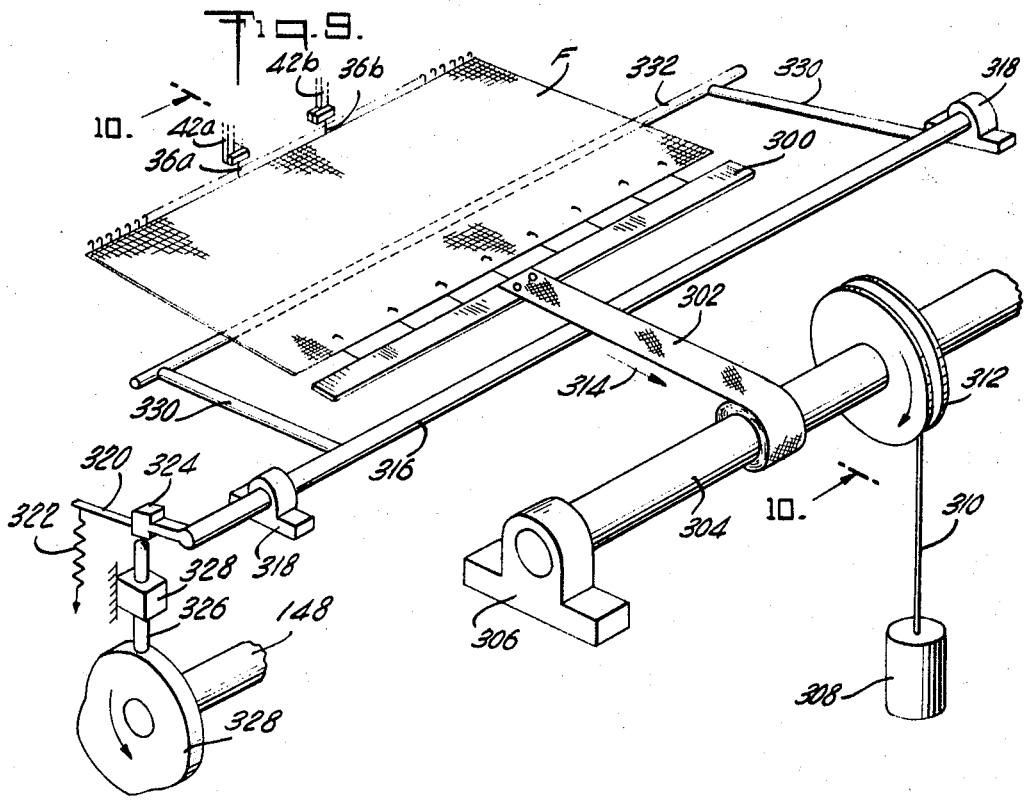
FIG. 9 is a perspective illustration of a structure of the invention for maintaining the cable loops reliably on the cable points during movement of the latter.

FIGS. 14A–14D respectively illustrate four successive steps of the method of the invention;

FIGS. 15A–15D respectively illustrate four successive steps during the knitting of a different type of cable according to the invention;

FIGS. 16A–16D respectively illustrate four successive steps which take place subsequent to those of FIGS. 15A–15D;

FIGS. 17A–17E respectively illustrate five successive steps of still another method of the invention for knitting another cable structure of the invention; and FIGS. 18A–18F respectively illustrate six steps of a method of the invention which take place subsequent to those shown in FIGS. 17A–17E.

As has been indicated above, the cable attachment of the invention can be added to a conventional knitting machine, and in the example illustrated in the drawings the cable attachment has been added to a conventional flatbed knitting machine of the type used, for example, for knitting full-fashioned stockings. The attachment of the invention utilizes part of the narrowing structure which is included in a conventional machine of this type. In particular, as may be seen from FIGS. 1 and 3, the machine includes a pair of brackets 30 which support the structure directly associated with the cable points. Referring to the left end of FIG. 3, each of the brackets 30 is fixed with an arm 32 actuated through conventional cams for carrying out the dipping motions conventionally carried out by the narrowing structure. Thus, the narrowing points are conventionally lowered and raised in order to engage and laterally transfer loops at the end of the knitted article for the purpose of narrowing or widening the article, and the same dipping and raising structure is used with the structure of the present invention and is therefore not illustrated or described further.

The illustrated structure includes a pair of cable points 36a and 36b which may have the same structure as conventional narrowing points. These cable points are carried by a pair of bar means 38a and 38b. The bar means 38a includes an elongated bar 40a made of any suitable metal and supported in suitable bearings for longitudinal shifting movement transversely of the wales of the knitted fabric. The bar means 38a includes, in addition to the bar 40a, a substantially L-shaped bracket 42a which is fixed to the bar 40a and which carries a clamp 44a by means of which the cable point 36a is clamped to the bracket 42a so as to be supported in this way by the bar means 38a for shifting movement therewith. In addition, the bar means 38a includes a rear projection 46a in the form of a block fixed to the bar 40a and a front projection 48a in the form of a pin fixed to the front of and projecting forwardly from the bar 40a.

The bar means 38b includes an elongated bar 40b situated beneath the extending parallel to the bar 40a and also supported for longitudinal shifting movement in any suitable bearings. The bar 40b fixedly carries the L-shaped bracket 42b to which the other cable point 36b is fixed by the clamp 44b. A projection 46b is in the form of a block fixed to and extending rearwardly from the bar 40b, and a front projection 48b is in the form of a pin fixed to and extending forwardly from the bar 40b. It will be noted that the bracket 42b is shorter than the bracket 42a so that the cable point 36b is situated at the same elevation as the cable point 36a. The brackets 42a and 42b thus form fingers each of which can carry one or more points, and they can be, if desired, specially built of a wider width than is normally used on a knitting machine.

The pair of bar means 38a and 38b form a part of a shifting means for shifting the points 36a and 36b through equal distances simultaneously in opposite directions. These distances are equal to strokes of one, two or three wales. Thus, as is shown by way of example in FIG. 4, the machine has just knitted the courses X, Y, Z in a conventional manner. After the course Z has been laid, the conventional knitting operations are terminated in a well known manner and the cable knitting attachment is operated, causing the structure which carries the point 36a to dip so that this point will engage the loop a of the course Z. Then the point 36a with the loop a thereon is raised and shifted to the right, as viewed in FIG. 4, by a stroke of one wale so as to situate the loop a over the loop b of the course Z. Now the attachment dips again to place the loop a on the same knitting needle as that on which the loop b is situated, and in this way the loop a has been transferred to the wale in which the loop b is located. Simultaneously the point 36b has shifted a loop in the course Z corresponding to the loop a to the left, as viewed in FIG. 4, onto the adjoining loop.

The shifting means includes, in addition to the pair of bar means 38a and 38b, a pair of stop means 50a and 50b and a pair of spring means 52a and 52b which urge the bar means 38a and 38b into engagement with the pair of stop means 50a and 50b. More specifically, the pair of stop means 50a and 50b are in the form of oppositely threaded nuts and include brackets 54a and 54b fixedly carried by the nuts 50a and 50b, respectively. The pair of spring means 52a and 52b are in the form of elongated coil springs which are under tension. The spring 52a is fixed at one end to the bracket 54a and at its opposite end to the bar 40a to urge the latter in a direction which will yieldably maintain the projection 46a in engagement with the projection 56a of the nut 50a. In the same way the spring 52b is fixed at one end to the bracket 54b and at its opposite end to the bar 40b for urging the latter to the left, so as to yieldably maintain the projection 46b in engagement with the projection 56b of the nut 50b. Thus, the pair of spring means will cause the pair of bar means to follow the movement of the nuts 50a and 50b.

A displacing means also forms part of the shifting means and cooperates with the nuts or stop means 50a and 50b for longitudinally displacing the latter simultaneously in opposite directions through equal distances. For this purpose a guide rod 58 extends slidably through horizontal bores formed in the nuts 50a and 50b so that the latter are guided for horizontal shifting movement. The displacing means includes the rotary threaded spindle 60 having the oppositely threaded portions 62a and 62b which are in threaded engagement with the oppositely threaded portions of the nuts 50a and 50b so that when turned in one direction the pair of stop means will move toward each other while when the spindle 60 is turned in an opposite direction the pair of stop means will be displaced away from each other.

In order to displace the pair of stop means 50a and 50b away from each other a ratchet wheel 64 is fixedly mounted on the spindle 60. This ratchet wheel 64 is turned through a given angular increment by a pawl 66 in the direction of the arrow 68 (FIG. 3) at each actuation of the pawl 66. The pawl 66 is normally out of engagement with ratchet 64 and is mounted on a lever 70 which is supported for pivotal movement by a stationary pivot 72 and which is turned by a rod 74 which may form part of a Bowden cable assembly actuated by a programming means of the invention described below.

To rotate the spindle 60 in an opposite direction a ratchet wheel 76 is fixed on the spindle 60. This ratchet wheel 76 is turned through predetermined angular increments in the direction of the arrow 78 (FIG. 3) by means of a pawl 80 which is normally out of engagement with ratchet 78 and is mounted on a lever 82 supported for turning movement by a stationary pivot 84 and actuated by a rod 88. This rod 88 also forms part of a Bowden cable assembly and is actuated by the programming means described below.

Thus, the spindle 60 will turn in the direction of the arrow 68 in response to turning of the ratchet 64 by the pawl 66, while pawl 80 is spaced from ratchet 76, so as to displace the pair of stop means 50a and 50b apart from each other. On the other hand, when the ratchet 76 is turned in the direction of the arrow 78 the pawl 66 is spaced from ratchet 64 and the spindle 60 turns in the direction of the arrow 78 so as to displace the pair of stop means 50a and 50b inwardly toward each other.

In this way the pair of stop means will be shifted through predetermined strokes and the pair of bar means will follow the pair of stop means. As will be apparent from the description below it is possible with the structure as thus far described to provide strokes equal to only one or two wales, but in accordance with an important feature of the invention it is possible to achieve three-wale strokes by adding an additional displacement of one wale to the pair of bar means through a displacing mechanism in addition to that described above.

This additional separate mechanism of the shifting means includes a pair of lever means 94a and 94b and an actuating means 96 (FIG. 3) for actuating the lever means. The lever means 94a is in the form of a bell crank pivoted at 98a on the bracket 54a and carrying a roller 100a which engages the projection 48a of the bar means 38a. At its end distant from the roller 100a, the lever 94a is pivoted with a bracket 102a connected to a Bowden cable 104a of a motion transmission which forms part of the actuating means 96. In much the same way the lever 49b is pivoted at 98b to the bracket 54b and carries a roller 100b which engages the pin 48b. At its end distant from roller 100b the lever 94b is pivotally connected with a bracket 102b which is connected to a Bowden cable 104b which forms part of the motion transmission of the actuating means 96.

The sheaths of the Bowden cables 104a and 104b are fixed to the brackets 54a and 54b, respectively, as well as to a stationary bracket 106. The Bowden cable wires which slide in the sheaths are fixed not only to the brackets 102a and 102b but also to the ends of a lever 108 of H-shaped configuration (FIG. 3) pivotally mounted on a stationary rod 110 and actuated by way of a rod 112 of the motion transmission.

The pair of ratchets 64 and 76 are actuated by the programming means described below so as to turn the spindle 60 for shifting the points 36a and 36b either inwardly or outwardly through strokes equal to a distance of one or two wales. When a stroke of three wales is called for by the programming means, the actuating means 96 will operate to actuate the pair of lever means 94a and 94b. When the rod 112 is moved upwardly, the rollers 100a and 100b turn away from each other to displace the points 36a and 36b away from each other simultaneously through a distance of one wale, so that in this way a third wale can be added to a stroke of two wales derived by way of the spindle 60.

As will be apparent from the description below, each step of the cable-knitting method of the invention includes a loop-shifting cycle and a selecting cycle during which the points are shifted without loops to selected positions for engagement with selected loops during the succeeding loop-shifting cycle. When carrying out a loop-shifting cycle having three-wale strokes which require the points 36a and 36b to move inwardly toward each other, during the immediately preceding selecting cycle the rod 112 is moved upwardly so as to initially displace the points away from each other, and in this way during the immediately subsequent loop-shifting cycle the springs 52 and 52b will act to shift the pins 48a and 48b inwardly toward each other while the rod 112 is moved downwardly to return the blocks 46a and 46b to engagement with the pair of stop means 50a and 50b. On the other hand, when the third wale of a three-stroke step requires outward movement of the points away from each other, the parts remain in the position where the blocks 46a and 46b engage the stops 50a and 50b during the selecting cycle and during the immediately subsequent loop-shifting cycle the rod 112 is moved upwardly to displace the points 36a and 36b apart from each other while moving the blocks 46a and 46b away from the stops 50a and 50b through a distance of one wale.

The actuating means 96 for the pair of lever means 94a and 94b includes the motion transmission part of which is shown in FIG. 3 and the remainder of which is shown in FIG. 5. This motion transmission transmits motion from a cam means which forms part of the actuating means 96 and which is also shown in FIG. 5, as well as in FIGS. 6 and 7. The part of the motion transmission which is shown in FIG. 5 includes the lower portion of the relatively rigid rod 112 whose upper portion is connected to the lever 108, as shown in FIG. 3.

Referring to FIG. 5, the lower end of the rod 112 is pivotally connected to a lever 114 of the motion transmission. The lever 114 is pivoted intermediate its ends on a suitable stationary bracket 116, and at its end distant from the rod 112 the lever 114 is bifurcated and carries a short shaft 118 on which a cam-follower roller 120 is turntable as well as axially shiftable. A spring 122 is connected with the lever 114 to urge the rod 112 upwardly.

However, in the position of the parts shown in FIG. 5, the lever 114 is latched against being turned by the spring 122 by way of a latching means 124 which includes a pivoted latch member 126 supported for turning movement on a stationary pivot 128. The upper arm 130 of the latch member 126 carries an adjustable bolt 132 the bottom end of which engages the upper face of the lever 114 to prevent turning thereof by the spring 122, in the position of the parts shown in FIG. 5. When the latching lever 126 is turned in a clockwise direction, as viewed in FIG. 5, the bolt 132 will be displaced away from the lever 114 and the spring 122 can turn the lever 114 so as to raise the rod 112 and thus provide through the Bowden cables 104a and 104b simultaneous turning of the levers 94a and 94b to displace the pair of points apart from each other.

In order to turn the lever 126 between its latching and unlatching positions it is pivotally connected with one end of the connecting rod 134 whose opposite end is pivotally connected to a crank arm 136 fixed to and extending radially from a rotary shaft 138 supported for rotary movement in a stationary bearing 140 and distant from the crank arm 142 pivotally connected to one end of an elongated rod 144. This rod can transmit turning to the lever 142 from the programming means in a manner described below and it may take the form of a suitable Bowden cable transmission.

The actuating means 96 for the pair of lever means 94a and 94b includes a cam means 146 which acts through the motion transmission on the levers 94a and 94b. This cam means 146 is carried by the rotary cam shaft 148 which forms part of the machine and rotates in the direction of the arrow 150 (FIG. 5). The cam shaft 148 carries three cams 152, 154, and 156 in side-by-side relation. These cams are of course fixed to the shaft 148 for rotation therewith. Cam shaft 148 is in a known way axially shiftable between a normal knitting position and a narrowing cycle position. It is shown in FIG. 5 in the normal knitting position where cam follower 120 engages the cam 156. This is an idle cam preventing follower 120 from falling off the cams, in the normal knitting position of shaft 148, and acting through the follower 120 on lever 114 to permit latching of lever 114 by latch 124 when coming out of a narrowing cycle.

As is well known, the cam shaft 148 turns through a single revolution during one complete operating step. During one half of each revolution of the cam shaft 148 the cable points dip down and are actuated in the same way as conventional narrowing points so as to engage certain needles to receive loops therefrom and to laterally transfer these loops in one direction or the other across a distance corresponding to the pitch of one or two needles, while during the remaining half of each revolution of the cam shaft 148 the points are returned upwardly back to their initial position, and it is during this upstroke of points that they are additionally shifted so as to be in a proper position for engaging other loops during the next downward stroke of the points at the next revolution of the cam shaft 148, during cable knitting operations.

Thus, in order to carry out the cable knitting operations the cam shaft 148 is shifted to the right, as indicated by the arrow in FIG. 7, thus displacing the idle cam 156 by one space to the right beyond the follower 120 which now becomes located over the cam 154, and this is neutral position of the cam follower 120 during cable knitting operations when the programming means of FIG. 8 does not change the position of the cam follower 120, in a manner pointed out in greater detail below. At this time, which is to say when the cam 154 has been shifted to a location beneath the follower 120, this follower will still remain out of engagement with the cam because the spring 122 cannot turn the follower 120 down into engagement with the cam, the structure being held in the position shown in FIG. 5 by the latching means 124. It is only when the lever 130 is turned in a clockwise direction about the pivot 128 that the lever 114 will be moved by the spring 122 so as to place the follower 120 in engagement with the cam 154. The angular position of the cam 154 on the shaft 148 and its configuration is such that during an upstroke of the cable points when they return to their initial position the cam 154 acts through the transmission on the levers 94a and 94b to turn the rollers 100a and 100b apart from each other so as to displace the points 36a and 36b apart from each other, whereas during the subsequent downward dipping movement of the points when the actual engagement and transferring of loops takes place, the angular position and configuration of the cam 154 is such that the points will now be transferred inwardly toward each other back to their initial positions.

On the other hand, the cam 152 is precisely of the same configuration as the cam 154 but is angularly displaced with respect thereto by 180°. Therefore, when the cam follower 120 is positioned over the cam 152, in a manner described below, this cam 152 will act through the follower 120 on the transmission to move the points outwardly away from each other during the downward dipping and loop transferring part of each revolution of the shaft 148, whereas during the upstroke of the points when they return to their initial position the cam 152 will act through the follower 120 on the transmission to return the points inwardly toward each other to their initial positions where the blocks 46a and 46b respectively engage the projections 56a and 56b of the stop members.

A positioning means 160 is actuated by the programming means for selectively positioning the follower 120 either in a position over the cam 152 or in a position over the cam 154. This positioning means includes the shifting fork 162 having at its front end a notch into which the follower 120 extends. The fork 162 is pivotally supported by a stationary pivot 164 so that it can turn about an axis perpendicular to the cam shaft 148. At its end distant from the follower 120 the shifting fork 162 is connected with a shifting rod 166 which is pulled to turn the fork 162 for shifting the follower 120 from its position over the cam 152 and into a position over the cam 154, and a second cable or rod 168 is connected with the shifting fork 162 so that when the cable or rod 168 is pulled the fork 162 will return the follower 120 from its position over the cam 154 to its position over the cam 152. These rods or Bowden cables 166 and 168 are actuated by the programming means in a manner described below.

FIGS. 6 and 7 respectively illustrate how the pivotal shifting fork 162 shifts the follower 120 along the shaft 118.

The programming means 170 is schematically illustrated in FIGS. 8 and 12. The programming means 170 includes the levers 172, 174, 176, 178 and 180 supported for rotary movement on a common stationary shaft 182 and pivotally connected with the free ends of the several rods or Bowden cables 166, 168, 144, 74 and 88 respectively. These levers 172, 174, 176, 178 and 180 are respectively provided with projections 184 which are adapted to be engaged by buttons on programming chains. Thus, the programming means includes a plurality of buttons 186 on chains 192. These chains are carried by sprockets 194 which are respectively fixed to the lower rotary shaft 196, supported for rotation by any stationary bearing structure 198, and an upper rotary shaft 200 supported for rotation by any suitable stationary bearing structure 202. The buttons 186 have a height which in cooperation with the several levers 172, 174, 176 and 178 will displace these levers through angles providing through the several rods or cables 166, 168, 144 and 174 the required increments of movement of the structures connected with these rods or Bowden cables. Thus, the buttons 186 on any one chain 192 may all be of a uniform height, although the buttons 186 on one chain may have a height different from the buttons 186 on another chain in order to provide in cooperation with the levers the required movements of the parts. Also, the buttons on any one chain may have different heights. For example, in the case of the chains which actuate the levers 178 and 180, one or both of these chains may have buttons of different heights for providing different increments of turning of the spindle 60. The buttons on these two chains are so arranged that only one of the pawls 66 and 80 cooperates with its ratchet at any one time. Thus, when the pawl 80 cooperates with the ratchet 76 the pawl 66 is out of engagement with the ratchet 64, while when the ratchet 64 is engaged by the pawl 66, the pawl 80 is out of engagement with the ratchet 76. Furthermore, the arrangement of the buttons on the chains is such that the ratchets can be turned by different angular distances providing through the spindle 60 a displacement of the points inwardly toward each other or outwardly away from each other through a distance which in some cases will be equal to a pitch of one needle, or in other words a distance of one wale, while at other times these points will be displaced either toward each other or away from each other through a distance equal to a pitch of two needles, or in other words across a distance occupied by two wales. The levers also are only indicated schematically as being of a uniform structure, but they can have different lengths to provide the required movements of the parts.

The shaft 200 is turned by a ratchet 204 which is fixed to the shaft and which is engaged by a pawl 206 pivoted on one end of a lever 208. The pawl 206 is urged into engagement with a pin 210, carried by the lever 208, by a spring 212. A spring 214 urges the lever 208 in a counterclockwise direction as viewed in FIG. 8 on the pivot 216 which is stationary and which supports the lever 208 for turning movement.

In this way the end of the lever 208 distant from the pawl 206 is maintained in engagement with a roller 218 turnably carried by one end of a lever 220 which is pivotally supported by a stationary pivot 222. The other end of the lever 220 carries a roller 224 which is maintained by the spring 214 in engagement with a cam 226 which is also fixed to the cam shaft 148 for rotation therewith.

This cam 226 has a pair of diametrically opposed lobes 228 and 230, so that during each revolution of the shaft 148 the programming means will be actuated twice. These lobes 228 and 230 thus successively initiate a loop-shifting cycle and a position-selecting cycle for each step during which the shaft 148 turns through one revolution, as pointed out above. Thus, the angular position of the cam is correlated with the angular positions of the cams 152 and 154 so that the loop shifting and position-selecting cycles will be successively carried out during each revolution of the shaft 148 to provide the operations described below.

It is thus possible with the above-described attachment which can be very easily connected to a conventional knitting machine, to provide either during the downward dipping movement or during the return stroke upwards of the cable points a movement of the points inwardly toward each other through a distance of one or two wales by way of the spindle 60 or outwardly away from each other through the same distance, and furthermore it is possible to provide a movement through a third wale during either downward or upward movement of the cable points by way of the transmission means of the invention. Thus, the programming means shown in FIG. 8 will actuate the ratchets 64 and 76 to provide turning of the spindle in one direction or the other through such an angle that the cable points will be moved toward each other or away from each other through a distance equal to one wale or two wales either during the downward movement of the points or during their upward return movement, as determined by the programming means. When the third space is required, the programming means acts on the lever 176 to pull on the rod 144 and thus displace the latching means 124 into its unlatched position. At the same time if no button has acted to shift the follower 120 from its neutral position, it will be situated over the cam 154 so that during the transferring cycle of each step the points will move inwardly toward each other while during the selecting cycle of each step the points will be moved away from each other. On the other hand, if the third space requires that the points move outwardly away from each other during the loop-transferring cycle, the buttons of the programming means act through the rod 168, by way of the lever 174, to swing the fork-shifting lever 162 so as to displace the cam 120 over the cam 152, and thus at this time during the loop-transferring cycle the points will be shifted away from each other while during the selecting cycle they will be moved back toward each other. The programming means will automatically return the follower 120 to its neutral position over the cam 154 when this latter type of operation is not called for, and in addition, when a third space is not called for the latching means 124 is automatically returned to its latching position by acting through the programming means on the rod 124 to swing the latching lever 126 back to its latching position shown in FIG. 5. In this connection the high point of the cam 154 is such that the lever 114 will turn very slightly below the screw 132 to permit the latter to latch over the lever 114, and when the cam follower 120 is in its neutral position over the cam 154 at each revolution of the cam shaft the lever 114 will be turned by an extremely slight angle even though it is latched, but this very slight movement will not affect the operations in any way and the third additional increment of movement of the points at each cycle is reliably avoided when the latching structure is in its latching position shown in FIG. 5.

With the structure described above it is possible to carry out the cable knitting method shown in FIGS. 14A–14D. In order to carry out this method each finger 42a and 42b carries a pair of cable points. FIGS. 14A–14D respectively illustrate the points X and Y, in a schematic manner, which are carried by the finger 42a, and it is to be understood that an identical pair of points are carried by the finger 42b. These points which are carried by the finger 42b will carry out precisely the same movement as those points which are carried by the finger 42a but in the opposite directions so that whenever the points carried by the finger 42a are displaced to the left, for example, by a given distance, the points carried by the finger 42b will be simultaneously displaced through the same distance but to the right, and vice versa.

Figure 14A:
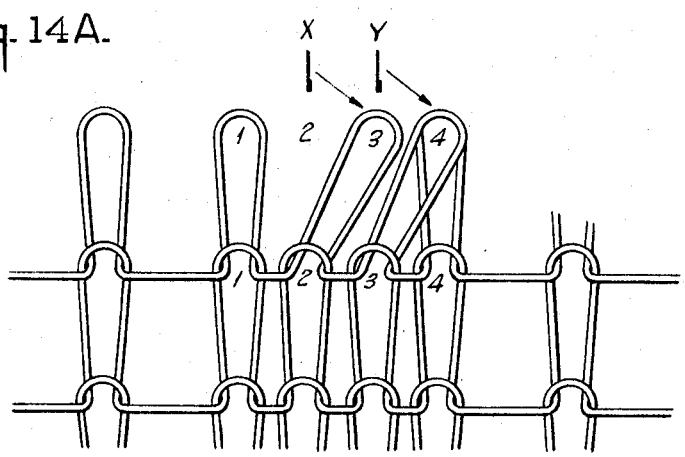

Referring to FIG. 14A, the cable which is knitted in accordance with the invention includes a cable knitted from a series of four consecutive wales knitted by the needles designated 1, 2, 3 and 4, as schematically shown in FIG. 14A. The points X and Y are also schematically indicated, and they are shown in each figure in their pick-up position which is to say in the position they take as they move down to engage loops which are to be transferred, and the direction and distance through which they transfer the loops are indicated by the arrows in the several figures, the loops being shown in the several figures in the positions to which they have been transferred by the points.

Thus, in FIG. 14A, the points X and Y are initially situated in line with the second and third wales of the consecutive series of four wales. During their dipping movement they receive the loops from needles 2 and 3, respectively, and they transfer these loops to the third and fourth wales, as indicated in FIG. 14A. Thus, during the first step of this method the second and third loops of a consecutive series of four wales are transferred respectively to the third and fourth wales, leaving the second wale free of any loops.

Figure 14B:
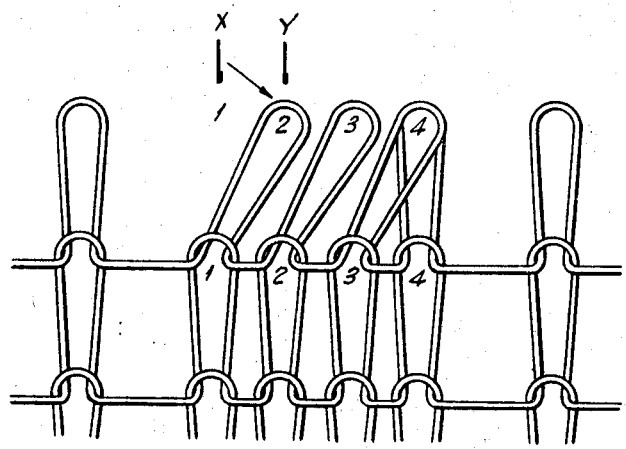

The points X and Y will thus be situated in line with needles 3 and 4 at the end of the loop-transferring cycle, and during the upstroke of the points when they return to their initial elevation the programming means shifts the points X and Y to the left so that they will become situated in alignment with needles 1 and 2, as shown in FIG. 14B. During the second step when the points move down to transfer loops, the point Y will of course receive no loop since needle 2 is empty, while the point X will take the loop which was supported by needle 1, and as indicated in FIG. 14B the transfer of the points at this time is to the right through a distance equal to a pitch of one needle, so that the loop formerly situated on needle 1 now becomes situated on needle 2, and thus a loop has been transferred from the first to the second wale.

Figure 14C:
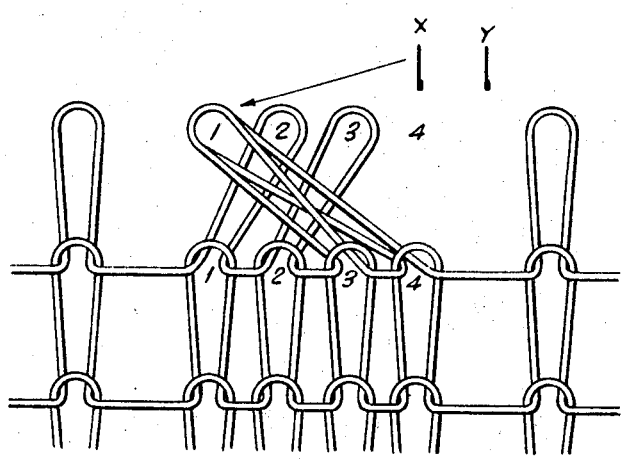
Figure 14D:
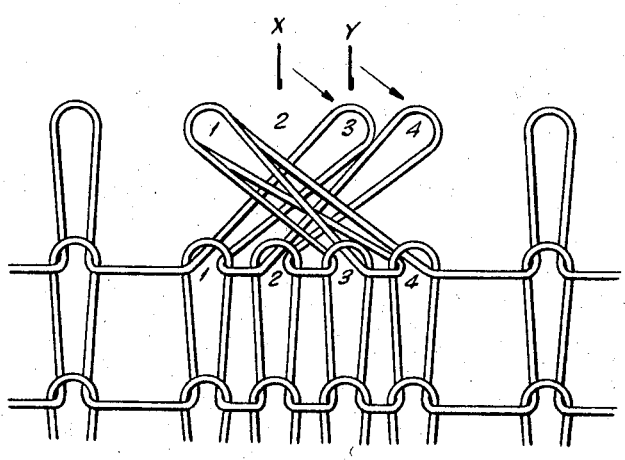

As may be seen from FIG. 14C, during the next upstroke of the points when they return to their initial elevation, they are shifted to the right through a distance of two wales, so that the point X becomes situated over needle 4, while the point Y simply becomes situated over the empty space where there are no needles. Now, when the points move down to carry out the step illustrated in FIG. 14C, the point X will engage both of the loops which are carried by the needle 4, and at this time the latching means has been unlatched and the cam follower 120 has been displaced by the programming means to a position over the cam 152 so that during the loop-transferring part of the revolution of the cam shaft the points are shifted outwardly away from each other not only by two spaces, by the spindle 60, but by an additional space brought about by the displacing means of the invention described above, so that in this way the point X can shift the two loops simultaneously onto needle 1, as illustrated in FIG. 14C. When this operation is completed the latching structure is returned by the programming means to its latching position and the cam follower 120 is returned to its neutral position over the cam 154. During the upward return stroke of the points they are displaced to the right through a pitch of one needle so that the points X and Y now become located over needles 2 and 3, as indicated in FIG. 14D, in line with the second and third wales. During execution of the steep shown in FIG. 14D the points move down to engage the loops on needles 2 and 3 and to displace these loops onto needles 3 and 4, as indicated in step 14D, and thus a cable structure as shown in FIG. 14D is provided.

It is to be noted that with this cable structure two of the loops at one side of the consecutive series have been acted upon in precisely the same way. Thus, the loops initially on needles 1 and 2 have been respectively displaced needles 3 and 4. On the other hand the remaining two loops, initially on needles 3 and 4, have been acted upon differently in that the loop initially on needle 3 has been displaced onto needle 1 across a pitch of two needles while the loop initially on needle 4 has been displaced across a pitch of three needles also onto the needle 1, and of course the second wale is free of any loops, as shown in FIG. 14D.

It will be noted that the method illustrated in FIGS. 14A–14D requires a total of four dips of the points, or in other words, four rotations of the cam shaft 148. Furthermore, it is to be noted that the loops initially on needles 3 and 4 and ending upon needle 1 are situated at the inside of the fabric, so that it is the pair of loops initially on needles 1 and 2 and ending up on needles 3 and 4 which are visible at the face side of the fabric, and in fact this pair of outer loops appear at the face side of the fabric as if nothing has been taken away from them, so that they give the effect, even if examined closely, of forming only one loop.

It is thus possible with the above-described method to form two-cord cable. As was indicate above the operations of FIGS. 14A–14D taking place in the cable at one side of the garment are repeated but in the opposite direction in the cable at the other side of the garment simultaneously by the points carried by the finger 42b. After the operations of FIGS. 14A–14D have been completed, conventional knitting is carried out for a predetermined number of courses and then the above operations are repeated, but at this time the operations taking place in the cable at one side of the fabric takes place in the opposite direction. In other words, at this time every movement shown in FIGS. 14A–14D to the right, takes place instead to the left, in the same cable, while at the other cable the moves shown in FIGS. 14A–14D are carried out. Then the same number of courses is again knitted between the end of the last cable knitting operations and the next following cable knitting operations, whereupon the initial operations are again repeated, and so on, to form a cable knitted article.

FIGS. 15A–15D show how the method of FIGS. 14A–14D can be adapted for use with a different type of cable. This cable has a central three-cord cable section composed of six consecutive wales, and this central section is situated between a pair of cable sections each of which includes four consecutive wales, so as to form a two-cord cable at each side of the central three-cord cable.

The machine is actuated to carry out the method of FIGS. 15A–15D in precisely the same way as described above in connection with FIGS. 14A–14D. The only difference in the structure is that each of the fingers 42a and 42b carries an additional pair of points V and W. The points X and Y operate on the four right wales of the central section in precisely the manner described above in connection with FIGS. 14A–14D, while at the same time points V and W act also in the precisely same way of the left cable section of FIGS. 15A–15D, and these points V and W need only be spaced from the points X and Y in the manner shown in FIGS. 15A–15D so as to carry out precisely the same operations on the left cable section shown in FIGS. 15A–15D. In this way there will be formed, as shown in FIG. 15D, at the four right wales of the central section precisely the same cable structure as shown in FIG. 14D, and at the left cable section of four consecutive wales also the very same cable construction.

Figure 16A:
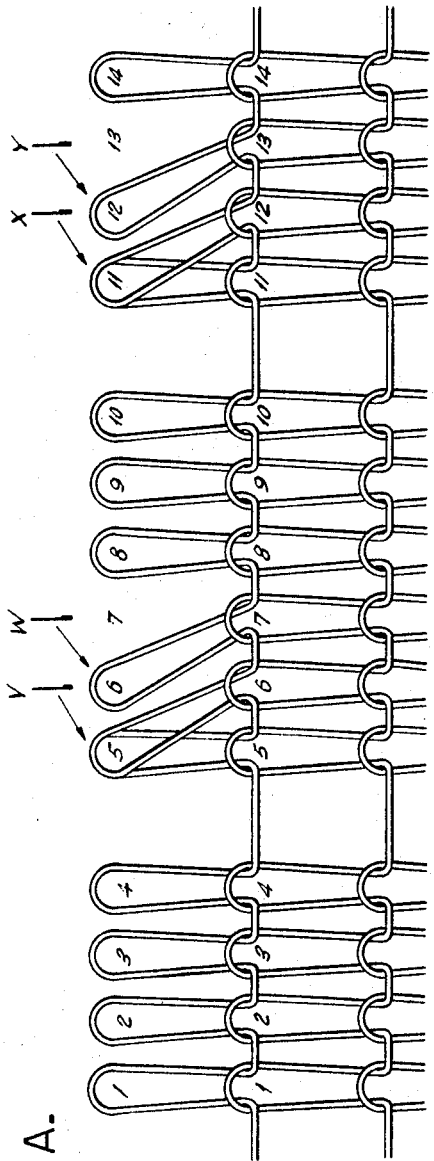
Figure 16B:
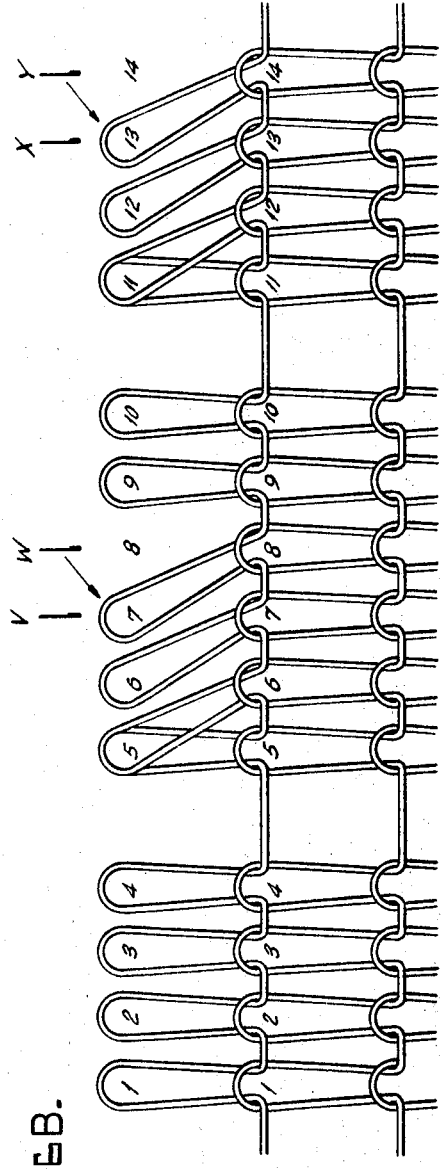

After these operations have been completed a given number of courses will be knitted in the usual manner, and then the above operations will be repeated but in the opposite direction, and this is indicated in FIGS. 16A–16D. Thus, referring to FIGS. 16A–16D, it will be seen that the movements shown in FIGS. 15A are carried out in FIG. 16A, but in the opposite direction and for the left four consecutive wales of the central section while also taking place simultaneously at the right cable section of four consecutive wales in FIG. 16A. Actually these operations were in fact carried out simultaneously with those of FIGS. 15A–15D but at the other side of the garment at the other cable thereof. The operations shown in FIGS. 16A–16D take place in the very same cable as that shown in FIGS. 15A–15D, but displaced from the latter operation by the number of regularly knit courses. At the other cable the operation shown in FIGS. 15A–15B are taking place simultaneously with those shown in FIGS. 16A–16D. Thus, at this time it is the points V and W which act on the loops of the central three-cord section, while points X and Y act on the loops of the right, two-cord section, and in this way the cable structure shown in FIG. 16D is achieved. Here again it will be noted that the cable structure is precisely the same as that of FIGS. 14D and 15D, except that the structure is situated at a different part of the cable and the loops are inclined in the opposite directions.

After the operations as shown in FIGS. 16A–16D have been completed, conventional knitting through the same predetermined number of courses takes place, and then the operations of FIGS. 15A–15D are again repeated. As a result there will be at the central three-cord section a given number of conventionally knit courses without any cable knitting between the successive portions where the cable knitting takes place, while at each side of the central section at each of the two-cord cables, there will be double the number of conventionally knit courses between the portions where the cable knitting takes place, as compared to the number of conventionally knit courses between cable-knit portions at the central section.

Thus, it is apparent that a considerable variety of cable structures can be very conveniently provided in a fully automatic manner by the addition of a simple attachment in accordance with the invention to a conventional knitting machine.

The structure of the invention can also knit cables on a split-gauge machine, sometimes referred to as a half-gauge machine, this being any machine of a specified gauge which is built as a dual gauge machine.

Figure 17A:
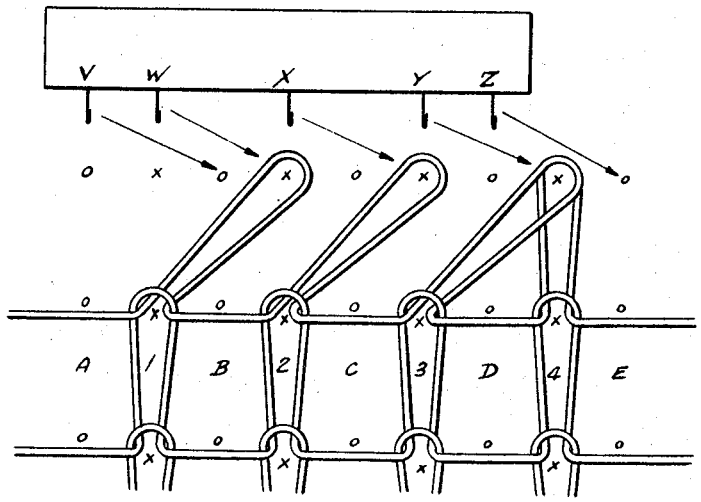

Referring to FIG. 17A, it will be seen that the needles 1, 2, 3, 4 are spaced from each other by the blank needle spaces A, B, D, E, so that the successive wales are spaced from each other by the blank needle spaces. Each of the fingers 42a and 42b carries five points, namely the points V, W, X, Y, Z as indicated in FIG. 17A. The cable operations shown in FIGS. 17A–17E take place for the points carried by the finger 42a, and here again it is to be understood that precisely the same operations take place at the other cable with the five points carried by the finger 42b, the only difference being that the operations take place in the opposite directions, as pointed out above.

Thus, referring to FIG. 17A, initially the points W, X and Y are aligned with the needles 1, 2, and 3, and during the dipping motion they move down to engage the loops on these needles and transfer them two spaces to the right, so as to situate the loops initially on needles 1, 2, and 3 on the needles 2, 3, and 4, as indicated in FIG. 17A.

Figure 17B:
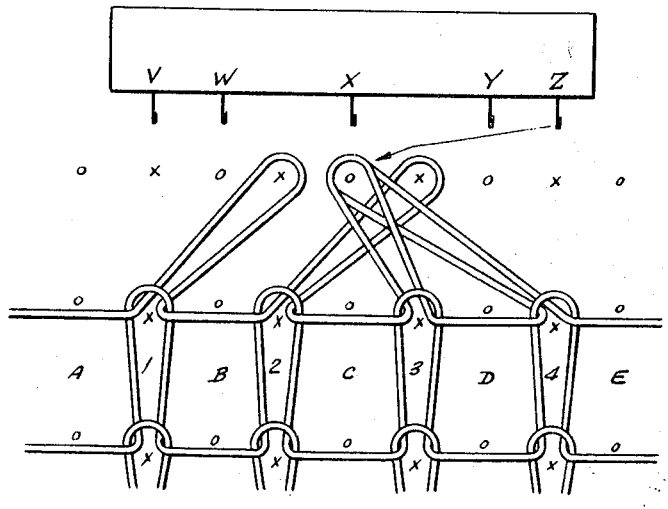

During the upstroke of the points when they return to their initial elevation, the position-selecting cycle for the next transferring cycle takes place, and at this time the points are shifted to the left by a single space, so that in this way the points have the position shown in FIG. 17B where the point Z becomes situated in alignment with needle 4, while all of the remaining points become situated over blank needle spaces. This of course does not apply to the point V which becomes situated over needle 1, but there is no loop on needle 1 at this time. During the dipping and loop-transferring portion of the portion of the step shown in FIG. 17B, only the point Z will act to transfer loops, this point Z engaging the pair of loops on needle 4 and transferring them inwardly by three spaces so that they become situated on the blank needle C. This movement of the loops onto the blank needle C required two spaces by way of the spindle and a third additional space by way of the attachment of the invention, as described above.

Figure 17C:
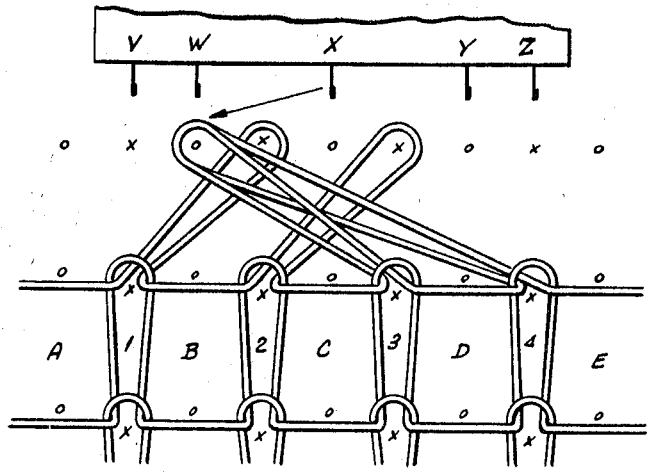
Figure 17D:
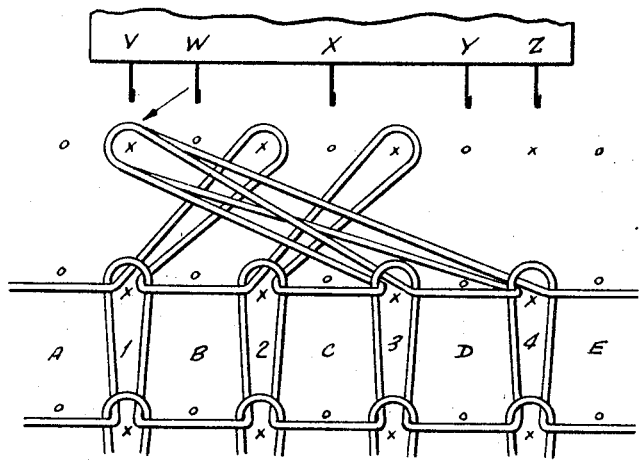

Referring to FIG. 17C, it will be seen that during the position selecting cycle while the points move upwardly they are returned three spaces to the right to again have the position shown in FIG. 17B, and now the point X will be positioned over the blank needle C so that during the next dipping motion the point X will engage the pair of loops on the blank needle C and will transfer them two spaces to the left so that they will now be on the blank needle B. During the subsequent return stroke of the points they are reset two spaces to the right so as to again assume the starting position shown in FIGS. 17B and 17C, and now during the next dip the point W will engage the pair of loops on the blank needle B and will shift them one space to the left so that they will be placed on needle 1.

Figure 17E:
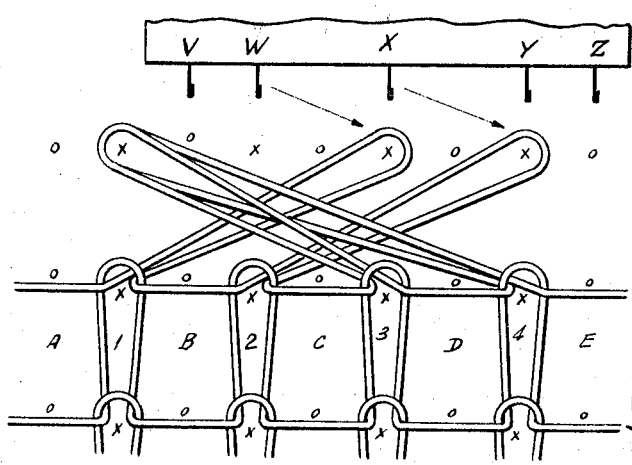

During the following up-stroke of the points they are shifted two spaces to the right so as to reach the position shown in FIG. 17E, and now during the downward dipping motion the points W and X will engage the loops on the needles 2 and 3 and will transfer them by two spaces to the right so as to situate these loops on the needles 3 and 4.

Therefore, at the end of the method shown in FIGS. 17A–17E, the same basic cable structure as described above is provided in the split or half-gauge type of machine with two of the loops at one side of the consecutive series of wales situated together on the same wale at the other side of the series, while two of the loops at this latter other side have been shifted in precisely the same way to two of the loops at the one side, thus providing the loops which initially were on needles 1 and 2 in a position situated on needles 3 and 4 while both of the loops which were on needles 3 and 4 become located only on needle 1, leaving needle 2 blank, with the pair of loops both of which are transferred to needle 1 being situated at the inner face of the fabric, as pointed out above.

Figure 18A:
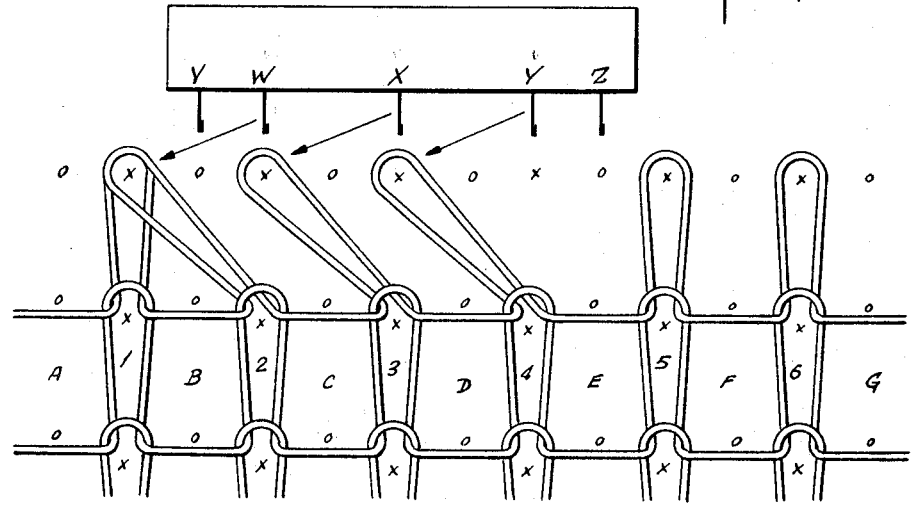

FIGS. 18A–18F illustrate the operations corresponding to those of FIGS. 17A–17E but shifting the loops in the opposite direction either simultaneously at the other cable or in the same cable after a given number of courses have been knitted in a conventional manner. Thus, referring to FIG. 18A, it will be seen that the points are now positioned so that the point Z carries out all of the operations performed in FIGS. 17A–17E by the point V, except in the opposite direction, the point Y performs the operations formerly performed by the point W, but in the opposite direction, the point X still carries out the same operations since it is centrally located, but also in the opposite direction, whereas the points W and V will now carry out the operations performed in FIGS. 17A–17E by the points Y and Z, respectively, but in the opposite directions. Therefore, in the first step shown in FIG. 18A the points W, X and Y engage the three loops on the needles 2, 3 and 4 and transfer them to the left by two spaces so that they become situated on the needles 1, 2 and 3, as indicated in FIG. 18A. During the upstroke of the points they are shifted one space to the right, so that the point V becomes situated over needle 1, and during the dipping and loop-transferring operations shown in FIG. 18B, the point V picks up the pair of loops on the needle 1 and transfers them one space to the right onto the blank needle B.

Figure 18B:
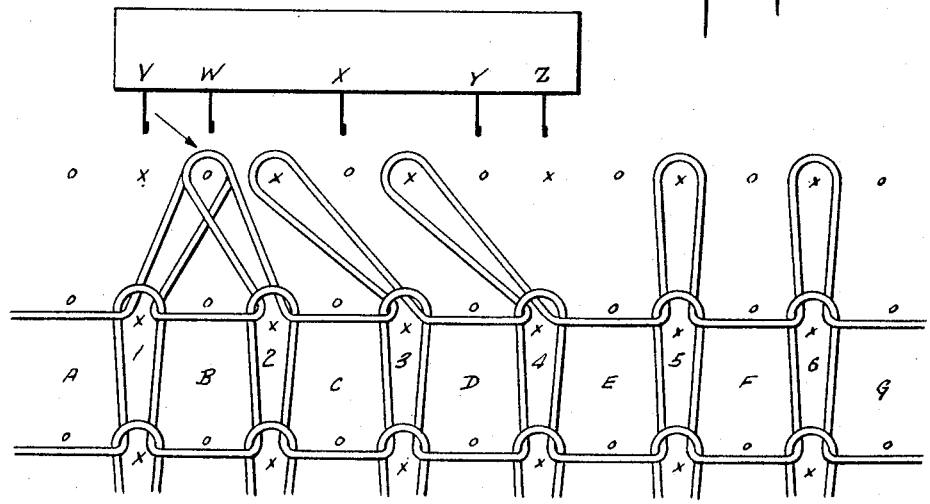
Figure 18C:
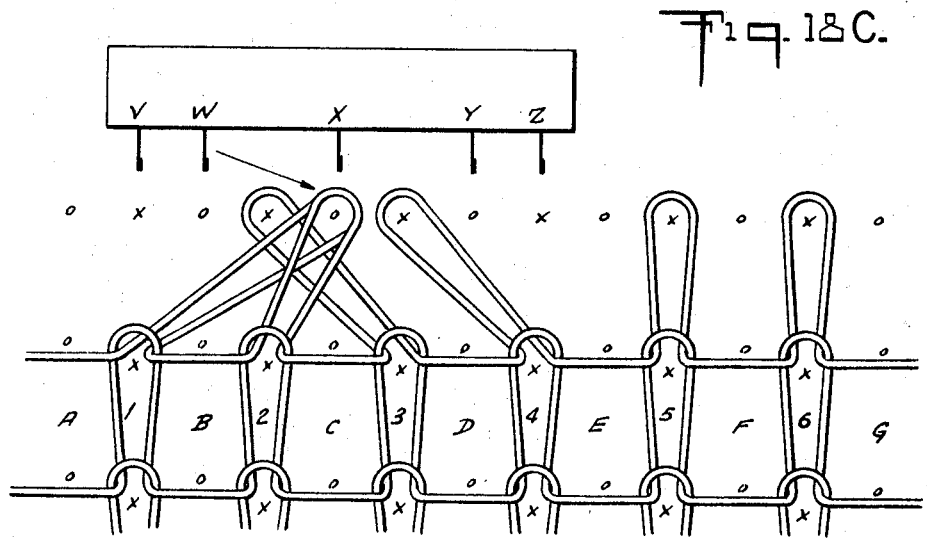

During the next upstroke the points are repositioned during the loop-selecting cycle one space to the left, so that the point W becomes situated over the blank needle B, and during the dipping and loop transferring operation shown in FIG. 18C the pair of loops are transferred from the needle B and are moved two spaces to the right onto the blank needle C.

Thus, it will be noted that two steps, namely those shown in FIGS. 18B and 18C are required to place the cable structure in the position shown in FIG. 17B which was achieved in one step. While this demonstrates the saving of steps which can be achieved with the attachment of the invention which enables a third space to be carried out, at the same time there is a certain advantage in carrying out these extra steps in connection with the opposite direction of loop inclination shown in FIGS. 18A–18F because in this way the repositioning of the points during the loop-selecting cycles is easier to carry out without the possibility of picking up loops at the wrong time. Thus, in the case of FIGS. 17A–17E, it will be noted that not only was a transfer of three spaces required for the steps shown in FIG. 17B, but in addition a three space repositioning cycle was required to situate the points at the location shown in FIG. 17C. However, in the case of FIGS. 18A–18F, one and two space transfers are required for the loops in FIGS. 18B and 18C, while in order to position the points for these transfers they only had to be shifted by spaces of one or two needles.

Figure 18D:
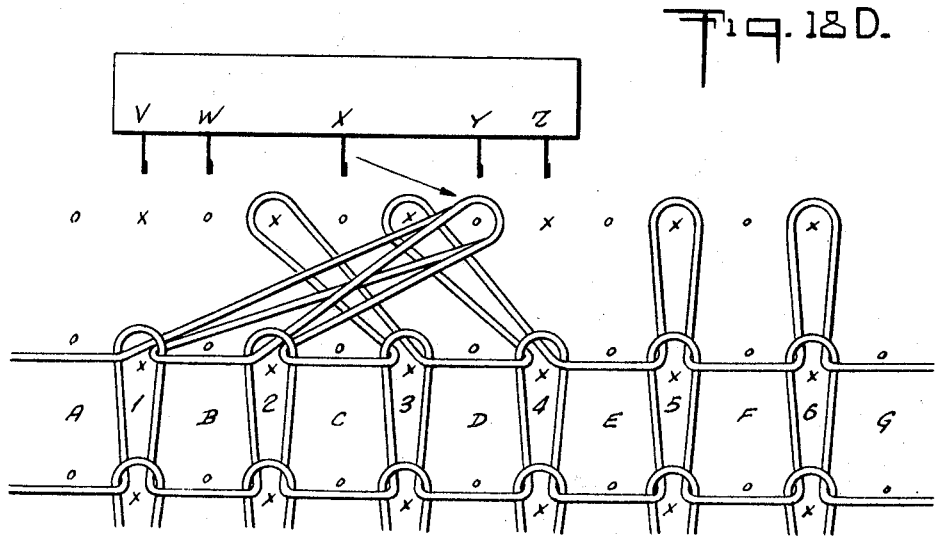

When the method has progressed to the stage shown in FIG. 18C, during the upward return movement of the points they are shifted two spaces to the left so that the point X becomes situated over the blank needle C, and now the step shown in FIG. 18D takes place during which on the subsequent dipping movement the point X picks up the double loop from the blank needle C and moves it two spaces to the right so as to position it on the blank needle D which now carries both of the loops which were initially on the needles 1 and 2.

Figure 18E:
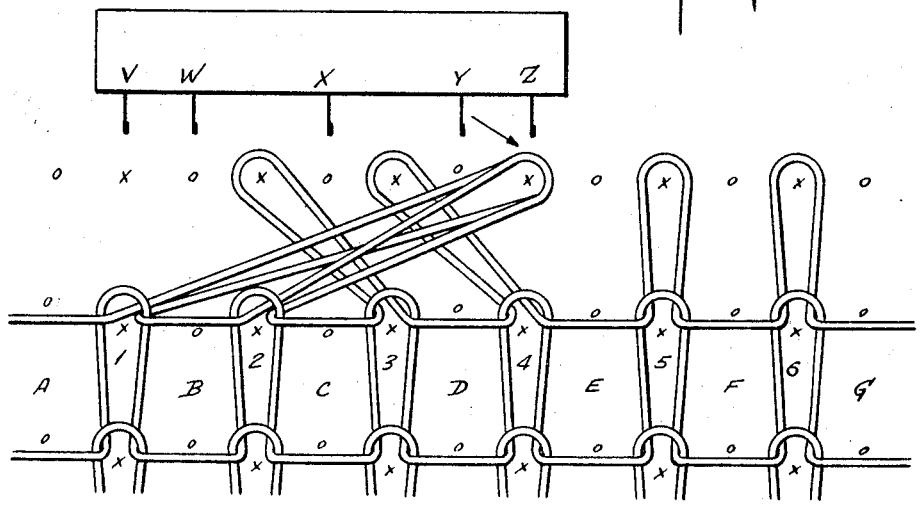

During the return stroke of the points they are repositioned so that they are shifted two spaces to the left again resuming the position shown in FIG. 18D, and it will be noted from FIG. 18E that the point Y is again located over the blank needle D, and during the next dipping and loop-transferring motion it is the point Y which engages the pair of loops on the blank needle D and shifts them to the right by one space so that they become located on needle 4.

Figure 18F:
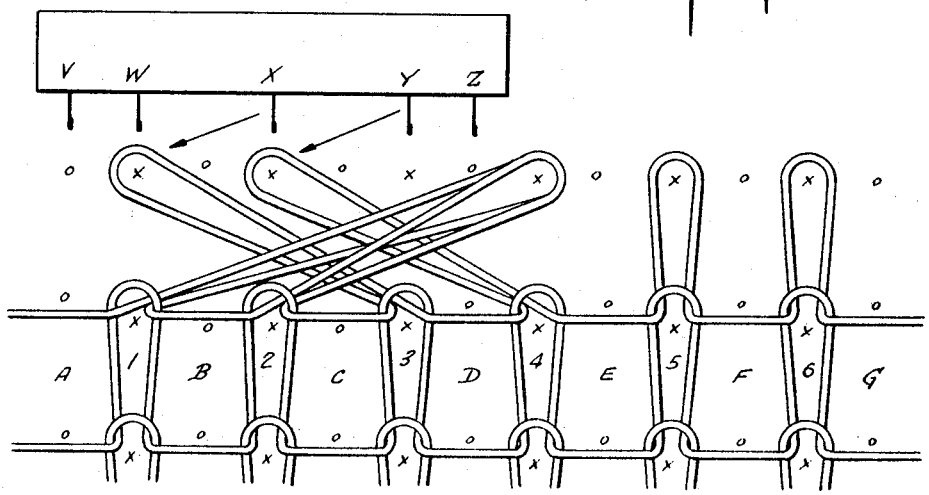

During the return stroke the points are repositioned so that they are shifted two spaces to the left to assume the position shown in FIG. 18F, and now during the final loop-transferring cycle points W and Y engage the loops on the needles 2 and 4 and shift them to the left two spaces so that they become situated on the needles 1 and 2.

In this way the braided cables on a half-gauge machine can be knit also in accordance with the invention, and it will be noted that again the same basic cable structure as is shown in FIG. 14D is provided with the invention.

Figure 13:
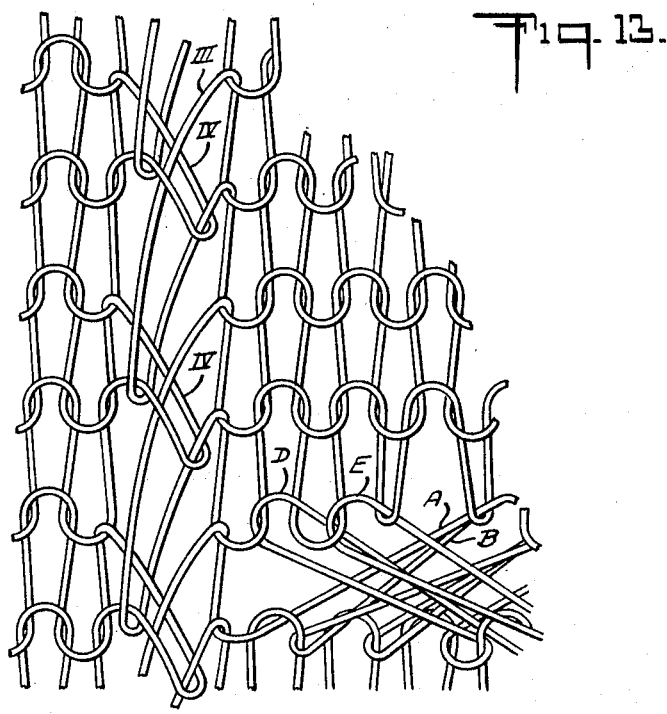
FIG. 13 is a representation of how the cable of the knitted fabric can be joined to the adjacent fabric.

It is possible to connect the cable structure to the rest of the fabric with the knitting shown in FIG. 13. For this purpose the knitting is carried out, as shown in FIG. 13, in such a way that the loops III along the side edges of the cable portion extend through the loops IV in the same course and then around the loops IV of the preceding course. At the same time the loops IV extend through the loops III of the next following course and around the loops III of the same course. In this way the knitting structure of FIG. 13 is provided at the connection between the cables and the remainder of the fabric.

Figure 10:
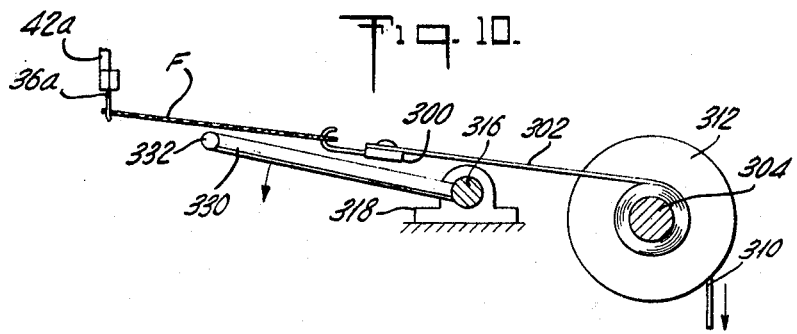
FIG. 10 is a side elevation, partly in section, of the structure of FIG. 9, taken along line 10—10 of FIG. 9 in the direction of the arrows.
Figure 11:
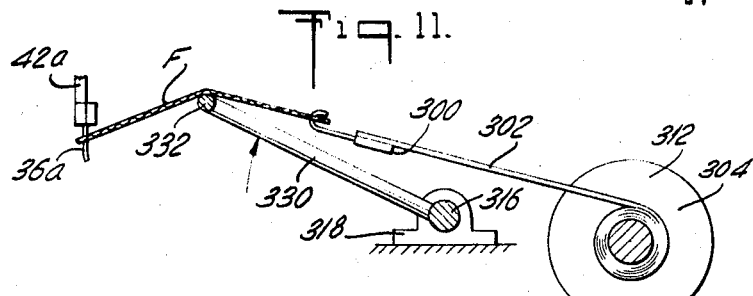
FIG. 11 shows the structure of FIG. 10 in a position different from that of FIG. 10.

According to a further feature of the invention the structures of FIGS. 9–11 are provided for reliably maintaining the loops on the cable points, particularly during dipping thereof, so that even when these points move upwardly the loops will reliably remain on the points to be shifted in the manner described above.

For this purpose the knitted fabric F is joined by suitable hooks to a bar 300 attached by a flexible strap 302 to a rotary shaft 304 about which strap 302 is wound. The shaft 304 is supported for rotary movement by any suitable bearings 306, and it is acted upon by a weight 308 so as to pull on the strap 302 and maintain the fabric F under tension. The weight 308 is connected by a cable 310 to a pulley 312 fixed to the shaft 304 so that as the successive courses are knitted the fabric will be pulled in the direction of the arrow 314 of FIG. 9.

A rotary shaft 316 is supported for rotation by any suitable bearings 318 and fixedly carries at one of its ends a lever 320 urged downwardly by a spring 322. This spring maintains a portion 324 of the lever 320 in engagement with the top end of a motion-transmitting pin 326 guided for free vertical sliding movement by any suitable stationary block 328 provided with a bore through which the rod or pin 326 slideably extends. The spring 322 also maintains the bottom end of the rod 326 in engagement with a rotary cam 328 carried by the cam shaft 148.

The shaft 316 fixedly carries a pair of rods 330 which extend radially from the shaft 316 and which fixedly carry at their outer ends a lifting bar or rod 322. This bar 332 extends beneath the knitted fabric F.

Referring now to FIGS. 10 and 11, the angular position of the cam 328 is such that simultaneously with the upward movement of the cable points during the loop-shifting cycles the lever 320 is turned in opposition to the spring 322 in a clockwise direction, thus raising the bar 332 in the manner shown in FIG. 11, and the result is that the loops will be urged upwardly toward the right, with respect to the cable points, such as the point 36a shown in FIG. 11. In this way the loops are reliably maintained on the cable points. In the rest position the rods 330 turn downwardly in the manner shown in FIG. 10 to displace the bar 332 back to a position spaced beneath the fabric F in preparation for the next loop-shifting cycle.

What is claimed is:

1. In a cable knitting attachment to be used with a conventional knitting machine, at least one cable point, shifting means operatively connected with said point for shifting the latter laterally across the wales of a fabric during the knitting thereof, said shifting means having strokes respectively equal to lateral distances of one, two, and three wales, and programming means operatively connected with said shifting means for programming the latter to carry out a predetermined number of said strokes in a predetermined sequence, said shifting means including a first mechanism for carrying out said strokes of one and two wales, and a second mechanism for carrying out an additional stroke of one wale which when added to said stroke of two wales provides the stroke of three wales.

2. In a cable knitting attachment to be used with a convention knitting machine, at least one cable point, shifting means operatively connected with said point for shifting the latter laterally across the wales of a fabric during the knitting thereof, said shifting means having strokes respectively equal to lateral distances of one, two, and three wales, and programming means operatively connected with said shifting means for programming the latter to carry out a predetermined number of said strokes in a predetermined sequence, an actuating means coacting with said programming means for actuating the latter through a series of loop-shifting cycles during which said programming means programs said shifting means to shift said point with at least one loop carried thereby through preselected strokes, respectively, and said actuating means actuating said programming means through a series of selecting cycles which respectively alternate with said loop-shifting cycles, said programming means during said selecting cycles programming said shifting means to shift the empty point to a preselected position in preparation for the next-following loop-shifting cycle.

3. The combination of claim 1 and wherein a drive means is operatively connected with said second mechanism for driving the latter, and latching means for releasably latching said drive means against operating said second mechanism, said programming means rendering said latching means operative to latch said drive means against operation during strokes of less than three wales.

4. In a cable attachment to be used with a conventional knitting machine, elongated, longitudinally movable bar means extending across the wales of a fabric during knitting thereof, a cable point carried by said bar means for longitudinal movement therewith transversely across the wales of the fabric, shiftable stop means, spring means urging said bar means into engagement with said shiftable stop means for following the movement thereof, displacing means operatively connected with said shiftable stop means for displacing the latter through strokes of one and two wales, lever means carried by said stop means and operatively connected with said bar means for moving the latter in opposition to said spring means through a distance of one wale, so that when said lever means is actuated said bar means will add to the movement of said bar means by said stop means the movement of said bar means by said lever means, actuating means operatively connected with said lever means for actuating the latter, and programming means operatively connected with said displacing means and with said actuating means for programming said displacing means to displace said stop means through a predetermined series of strokes of one and two wales and for programming said actuating means to add to predetermined two-wale strokes of said stop means an additional wale providing three-wale strokes for said cable point.

5. The combination of claim 4 and wherein said actuating means includes a Bowden cable operatively connected with said lever means for actuating the latter, a motion transmission connected with said cable, rotary cam means actuating said motion transmission for moving said cable to actuate said lever means, and latch means releasably latching said transmission against operation by said cam means, said programming means displacing said latching means between latching and unlatching positions.

6. The combination of claim 5 and wherein said transmission has one position with respect to said cam means where the latter initially controls said Bowden cable to maintain said bar means in engagement with said stop means and then actuates said Bowden cable to turn said lever means for displacing said bar means away from said stop means in opposition to said spring means for shifting a loop in one direction, said transmission having another position with respect to said cam means where said transmission initially actuates said Bowden cable to initially displace said bar means in opposition to said spring means away from said stop means for subsequently releasing said bar means to said spring means to be displaced thereby in an opposite direction for shifting a loop carried by said cable point in said opposite direction, and said programming means cooperating with said transmission for placing the latter in one or the other of said positions thereof.

7. In a cable knitting attachment to be used with a conventional knitting machine, a pair of cable points, shifting means operatively connected with said points for shifting the latter simultaneously in opposite directions through strokes of one and two wales, additional means operatively connected with said point for shifting the latter simultaneously in opposite direction through a distance of one wale, and programming means operatively connected with said shifting means and with said additional means for programming said shifting means and additional means to shift said points through a series of strokes ranging between one and three wales, said additional means being actuated by said programming means to add one wale to two-wale strokes of said shifting means for providing three-wale strokes of said points.

8. In a knitting machine, a pair of cable points which move upwardly during transposing of loops in connection with the knitting of cables, means maintaining a fabric under tension during operation of the cable points, and raising means for raising the tensioned fabric simultaneously with upward movement of the points so as to maintain loops thereon.

9. The combination of claim 8 and wherein said raising means includes a lifting bar, a lever carrying said bar for turning the latter in a direction which will raise the fabric, and cam means actuating said lever to raise said bar and thus lift the fabric simultaneously with the upward movement of the points.

10. In a cable knitting method for knitting a cable from a series of four consecutive wales by four consecutive needles situated between empty spaces where there are no needles, while utilizing for the cable knitting two points spaced from each other by a distance equal to the distance between a pair of successive needles of the four consecutive needles, the steps of initially situating the points in line with the second and third of the consecutive series of four wales, actuating the points to remove loops of the second and third wales from the second and third needles of the series and to transfer the latter loops to the third and fourth wales, leaving the second wale free of loops, then shifting the points into alignment with the first and second needles, then actuating the points to transfer with that point which is in alignment with the first needle a loop from the latter to the second needle, so that the latter loop is transferred from the first to the second wale, then positioning the points at a location where one point is in alignment with the fourth needle and the other point is in alignment with the empty space beside the fourth needle, then actuating the points to remove with the point aligned with the fourth needle the pair of loops at the fourth wale and to transfer the points toward the first needle through a distance equal to a pitch of three needles and thus locating the pair of loops removed from the fourth needle on the first needle at the first wale, then displacing the points toward the fourth needle through a pitch of one needle so that they become aligned with the second and third needles, in line with the second and third wales, and finally actuating the points to remove the loops of the second and third wales from the second and third needles and transfer them through a pitch of one needle onto the third and fourth needles, respectively, at the third and fourth wales.

11. In a method as recited as in claim 10 and wherein a series of six consecutive needles and wales are separated from said series of four consecutive wales by one of said empty spaces, carrying out on all except an end pair of the series of six consecutive wales and needles, with a pair of points identical with those used with the four consecutive wales, all of the steps which are performed in cable knitting with the four consecutive wales simultaneously with the latter steps, so that simultaneously with the knitting of a cable at said four consecutive wales a second cable is knitted at all except the end pair of the six consecutive wales.

12. In a method as recited in claim 11 and wherein a second series of four consecutive wales are situated at the side of said series of six consecutive wales opposite from the first-mentioned series of four consecutive wales with said second series of four consecutive wales also separated by an empty space from said series of six consecutive wales, and with said end pair of wales situated between the first-mentioned series of four consecutive wales and the remaining four wales of said series of six consecutive wales acted upon by said second pair of points, the steps of knitting a given number of courses after the cable knitting operations are completed on the first-mentioned series of four consecutive wales and on all of the series of six consecutive wales except said end pair thereof, and then repeating all of said cable knitting steps with opposite loop-transferring directions on said second series of four consecutive wales and on all of the series of six consecutive wales except an end pair thereof situated adjacent the second series of four consecutive wales.

13. In a method for knitting a cable from a series of four consecutive wales having loops respectively situated on four consecutive needles which alternate with and are successively situated between a series of five consecutive blank needles, utilizing a series of five points including a pair of outer end points spaced from each other by a distance equal to the distance between four consecutive blank needles, a pair of intermediate points respectively situated inwardly of the pair of outer end points by a distance equal to that between a blank needle and a knitting needle, and a central point situated midway between the outer end pair of points, the steps of situating said points initially with said outer end points aligned with the first and fourth blank needles, with said intermediate pair of points respectively in alignment with the first and third knitting needles, and with said central point aligned with the second knitting needle, then actuating said points to simultaneously remove loops of the first three wales from the first three knitting needles and to transfer the loops to the second, third, and fourth knitting needles, then shifting said points to locate the outer end pair of points in alignment with the first and fourth knitting needles, so that one of the outer end pair of points becomes aligned with the pair of loops on the fourth knitting needle, then actuating said points to remove the pair of loops on the fourth knitting needle from the latter with said one outer end point and to transfer the pair of thus-removed loops to the third blank needle, then positioning said points to locate the central point in alignment with the third blank needle, then actuating the points to remove with said central point the loops from the third blank needle and to transfer the thus-removed loops to the second blank needle, then positioning the points so that the outer end pair of points are aligned with the first and fourth knitting needles, thus situating one of the intermediate pair of points in alignment with the second blank needle, then actuating the points to remove with said one of said pair of intermediate points said loops from said second blank needle and to transfer the thus-removed loops to the first knitting needle, then positioning the points with the outer end pair of points respectively aligned with the second and fifth blank needles, so that the intermediate pair of points become aligned with the second and third knitting needles, and finally actuating said points to remove with said central point and with said one of said pair of intermediate points the loops from said second and third knitting needles and to transfer the thus-removed loops to the third and fourth knitting needles, respectively.

14. In a method for knitting a cable from a series of four consecutive wales having loops situated on four consecutive knitting needles which respectively alternate with and are successively situated between five blank needles, utilizing five points which include a pair of outer end points spaced from each other by a distance equal to that between four consecutive blank needles, a pair of intermediate points respectively situated inwardly of said outer end points by a distance equal to that between a blank needle and the next-following knitting needle, and a central point situated midway between the outer end points, the steps of situating the points initially with the outer end points aligned with the second and fifth blank needles, actuating said points to remove with said pair of intermediate points and said central point loops from the second, third, and fourth knitting needles and to transfer the thus-removed loops to the first, second, and third knitting needles, respectively, then positioning the points with the outer end pair of points respectively aligned with the first and fourth knitting needles, so that one of said outer end points is aligned with the pair of loops on the first knitting needle, then actuating the points to remove with said one end point the pair of loops from the first knitting needle and to transfer the thus-removed pair of loops to the second blank needle, then positioning the points with the outer end points aligned with the first and fourth knitting needles so that one of the intermediate pair of points becomes aligned with the pair of loops on the second blank needle, then actuating the points to remove the pair of loops on the second blank needle with said one of said pair of intermediate points and to transfer the thus-removed pair of loops from the second blank needle to the third blank needle, then positioning the points so that the outer end points are again aligned with the first and fourth knitting needles, so that the central point becomes aligned with the pair of loops on the third blank needle, then actuating the points to remove with said central point said loops from said third blank needle and to transfer the thus-removed pair of loops to the fourth blank needle, again positioning the points with the outer end points aligned with the first and fourth knitting needles, so that the other of the pair of intermediate points becomes aligned with the pair of loops on the fourth blank needle, then actuating the points to remove with said other of said pair of intermediate points said pair of loops from said fourth blank needle and to transfer the thus-removed pair of loops from said fourth blank needle to the fourth knitting needle, then positioning the points with the outer end points aligned with the first and fourth blank needles, so that said central point and said other of said pair of intermediate points become aligned with the loops on the second and third knitting needles, and finally actuating the points to remove with said central point and with said other of said pair of intermediate points said loops from said second and third knitting needles and to transfer the latter thus-removed loops to the first and second knitting needles, respectively.

15. In a method as recited in claim 10 and wherein after said cable knitting steps are completed a series of courses are knitted and then all of the above steps are repeated with loop transfer taking place in an opposite direction.

16. The combination of claim 10 and wherein the cable knitting operations take place at one side of a garment having a second series of four consecutive wales situated at an oppostie side thereof, carrying out all of said steps simultaneously at the second series of four consecutive wales.

17. In a method as recited in claim 16 and wherein the steps carried out at the second series of four consecutive wales are performed with transfer of loops in a direction opposite to the direction of loop transfer at the first-mentioned series of four consecutive wales.

References Cited

UNITED STATES PATENTS

| | | | |
|---|---|---|---|
| 2,005,070 | 6/1935 | Bitzer | 66—96 |
| 2,182,220 | 12/1939 | Bitzer | 66—96 |
| 2,287,480 | 6/1942 | Lambach | 66—96 |
| 2,687,629 | 8/1954 | Lambach | 66—96 |
| 2,923,142 | 2/1960 | Golaski | 66—96 |
| 3,004,415 | 10/1961 | Golaski | 66—96 |
| 3,100,975 | 8/1963 | Brown et al. | 66—96 |
| 3,242,697 | 3/1966 | Harrison et al. | 66—96 |
| 3,246,488 | 4/1966 | Harrison et al. | 66—96 |
| 3,256,718 | 6/1966 | Boutillette et al. | 66—96 |
| 3,290,899 | 12/1966 | Kaltsas et al. | 66—96 |

FOREIGN PATENTS

| | | |
|---|---|---|
| 30,227 | 12/1910 | Great Britain. |

RONALD FELDBAUM, *Primary Examiner.*